(12) United States Patent
Solihin et al.

(10) Patent No.: US 11,281,545 B2
(45) Date of Patent: Mar. 22, 2022

(54) METHODS OF CRASH RECOVERY FOR DATA STORED IN NON-VOLATILE MAIN MEMORY

(71) Applicant: University of Central Florida Research Foundation, Inc., Orlando, FL (US)

(72) Inventors: Yan Solihin, Orlando, FL (US); Mohammad Alshboul, Raleigh, NC (US); James Tuck, Raleigh, NC (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 357 days.

(21) Appl. No.: 16/564,479

(22) Filed: Sep. 9, 2019

(65) Prior Publication Data
US 2020/0081802 A1    Mar. 12, 2020

Related U.S. Application Data

(60) Provisional application No. 62/728,478, filed on Sep. 7, 2018.

(51) Int. Cl.
*G06F 11/14* (2006.01)
*G06F 12/12* (2016.01)

(52) U.S. Cl.
CPC ......... *G06F 11/1469* (2013.01); *G06F 12/12* (2013.01); *G06F 2201/82* (2013.01); *G06F 2212/1021* (2013.01)

(58) Field of Classification Search
CPC ....... G06F 11/14; G06F 11/1469; G06F 12/12
See application file for complete search history.

(56) References Cited

U.S. PATENT DOCUMENTS

| | | | |
|---|---|---|---|
| 9,098,455 B2 | 8/2015 | Atluri et al. | |
| 9,946,607 B2 | 4/2018 | Sundararaman et al. | |
| 10,019,331 B2 | 7/2018 | Booss et al. | |
| 10,140,031 B2 | 11/2018 | Seong et al. | |
| 2002/0032840 A1* | 3/2002 | Campbell | G06F 12/0846 711/119 |

(Continued)

OTHER PUBLICATIONS

Ferreira et al., A Study of Checkpoint Compression for High-performance Computing Systems. International Journal of High Performance Computer Applications. 2014: 1-20.

(Continued)

*Primary Examiner* — Kamini B Patel
(74) *Attorney, Agent, or Firm* — Smith & Hopen, P.A.; Paul Murty

(57) ABSTRACT

Lazy Persistency (LP), a software persistency method that allows caches to slowly send dirty blocks to the non-volatile main memory (NVMM) through natural evictions. With LP, there are no additional writes to NVMM, no decrease in write endurance, and no performance degradation from cache line flushes and barriers. Persistency failures are discovered using software error detection (checksum), and the system recovers from them by recomputing inconsistent results. LP was evaluated and compared to the state-of-the-art Eager Persistency technique from prior work. Compared to Eager Persistency, LP reduces the execution time and write amplification overheads from 9% and 21% to only 1% and 3%, respectively.

20 Claims, 26 Drawing Sheets

```
Original Code:
for (i=0; i<N; i++) {
    C[i] = foo(A[i],B[i]);
    D[i] = bar(A[i],B[i]);
}
```

```
Eager Persistency Code:
for (i=0; i<N; i++) {
    DurableTX {
        C[i] = foo(A[i],B[i]);
        CLFLUSH(&C[i]);
        D[i] = bar(A[i],B[i]);
        CLFLUSH(&D[i]);
        SFENCE;
    }
    last_i = i;
    CLFLUSH(&last_i);
    SFENCE;
}
```

```
Lazy Persistency code:
for (i=0; i<N; i++) {
    C[i] = foo(A[i],B[i]);
    D[i] = bar(A[i],B[i]);
    CkSum(i,C[i],D[i]);
}
```

```
Recovery code:
for (i=0; i<N; i++) {
    if (!validCkSum(i,C[i],D[i])) {
        C[i] = foo(A[i],B[i]);
        CLFLUSH(&C[i]);
        D[i] = bar(A[i],B[i]);
        CLFLUSH(&D[i]);
        SFENCE;
    }
    last_i = i;
    CLFLUSH(&last_i);
    SFENCE;
}
```

(56) References Cited

U.S. PATENT DOCUMENTS

| | | | | |
|---|---|---|---|---|
| 2002/0078244 | A1* | 6/2002 | Howard | G06F 16/1865 709/248 |
| 2010/0011165 | A1* | 1/2010 | Rossi | G06F 12/126 711/128 |
| 2011/0153944 | A1* | 6/2011 | Kursawe | G06F 12/0802 711/122 |
| 2018/0121454 | A1* | 5/2018 | Kushwah | G06F 16/13 |
| 2018/0293175 | A1* | 10/2018 | Chang | G06F 12/127 |
| 2019/0205244 | A1* | 7/2019 | Smith | G06F 12/12 |
| 2020/0073823 | A1* | 3/2020 | Kourtis | G06F 12/0253 |
| 2020/0409867 | A1* | 12/2020 | Colglazier | G06F 12/0895 |

OTHER PUBLICATIONS

Kannan et al., Optimizing Checkpoints Using NVM as Virtual Memory. Proceedings of the International Parallel and Distributed Processing Symposium (IPDPS). 2013: 1-12.

Kultursay et al., Evaluating STT-RAM as an Energy-effcient Main Memory Alternative. Proceedings of the International Symposium on Performance Analysis of Systems and Software (ISPASS). 2013: 256-267.

Awad et al., ObfusMem: A Low-Overhead Access Obfuscation for Trusted Memories. Proceedings of the International Symposium on Computer Architecture (ISCA). 2017: 107-119.

Awad et al., Non-volatile Memory Host Controller Interface Performance Analysis in High-performance I/O Systems. Proceedings of International Symposium on Performance Analysis of Systems and Software (ISPASS). 2015: 1-12.

Awad et al., Silent Shredder: Zero-Cost Shredding for Secure Non-Volatile Main Memory Controllers. Proceedings of the International Conference on Architectural Support for Programming Languages and Operating Systems (ASPLOS). 2016: 1-15.

Awad et al., Write-Aware Management of NVM-based Memory Extensions. Proceedings of the International Conference on Supercomputing (ICS). 2016: 1-12.

Osawa et al., Accelerating matrix multiplication in deep learning by using low-rank approximation. 2017 International Conference on High Performance Computing Simulation (HPCS). 2017: 186-192.

Elnawawy et al., Efficient Checkpointing of Loop-Based Codes for Non-Volatile Main Memory. 26th International Conference on Parallel Architectures and Compilation Techniques (PACT). 2017: 318-329.

Liu et al., iDO: Computer-directed failure atomicity for nonvolatile memory. 2018 51st Annual IEEE/ACM International Symposium on Microarchitecture (MICRO). 2018: 1-13.

Kolli et al., High-performance Transactions for Persistent Memories. Proceedings of International Conference on Architectural Support for Programming Languages and Operating Systems (ASPLOS). 2016: 1-13.

* cited by examiner

Original Code:
```
for (i=0; i<N; i++) {
    C[i] = foo(A[i],B[i]);
    D[i] = bar(A[i],B[i]);
}
```

Eager Persistency Code:
```
for (i=0; i<N; i++) {
    DurableTX {
        C[i] = foo(A[i],B[i]);
        CLFLUSH(&C[i]);
        D[i] = bar(A[i],B[i]);
        CLFLUSH(&D[i]);
        SFENCE;
    }
    last_i = i;
    CLFLUSH(&last_i);
    SFENCE;
}
```

Lazy Persistency code:
```
for (i=0; i<N; i++) {
    C[i] = foo(A[i],B[i]);
    D[i] = bar(A[i],B[i]);
    ckSum(i,C[i],D[i]);
}
```

Recovery code:
```
for (i=0; i<N; i++) {
    if (!validCkSum(i,C[i],D[i])) {
        C[i] = foo(A[i],B[i]);
        CLFLUSH(&C[i]);
        D[i] = bar(A[i],B[i]);
        CLFLUSH(&D[i]);
        SFENCE;
    }
    last_i = i;
    CLFLUSH(&last_i);
    SFENCE;
}
```

FIG. 1

```
1   for (i=0; i<N; i++) {
2       logC = createLog(&C[i], C[i]) ;
3       logD = createLog(&D[i], D[i]) ;
4       logLast_i = last_i ;
5       CLFLUSHOPT(logC);
6       CLFLUSHOPT(logD);
7       CLFLUSHOPT(logLast_i);
8       SFENCE;
9       logStatus = 1;
10      CLFLUSHOPT(&logStatus);
11      SFENCE;
12      C[i] = foo(A[i], B[i]) ;
13      D[i] = bar(A[i], B[i]) ;
14      last_i = i ;
15      CLFLUSHOPT(&C[i]);
16      CLFLUSHOPT(&D[i]);
17      CLFLUSHOPT(&last_i);
18      SFENCE;
19      logStatus = 0;
20      CLFLUSHOPT(&logStatus);
21      SFENCE;
22  }
```

FIG. 2

```
1  for (kk=0; kk<n; kk+=bsize)
2   for (ii=0; ii<n; ii+=bsize)
3    for (jj=0; jj<n; jj+=bsize)
4     for (i=ii; i<(ii+bsize); i++)
5      for (j=jj; j<(jj+bsize); j++)
6      {
7       sum = c[i][j];
8       for(k=kk; k<(kk+bsize); k++)
9        sum += a[i][k]*b[k][j];
10      c[i][j] = sum;
11     } //end of the j for loop
```

FIG. 4

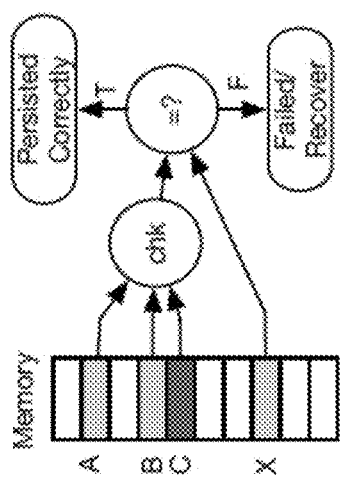
FIG. 5C
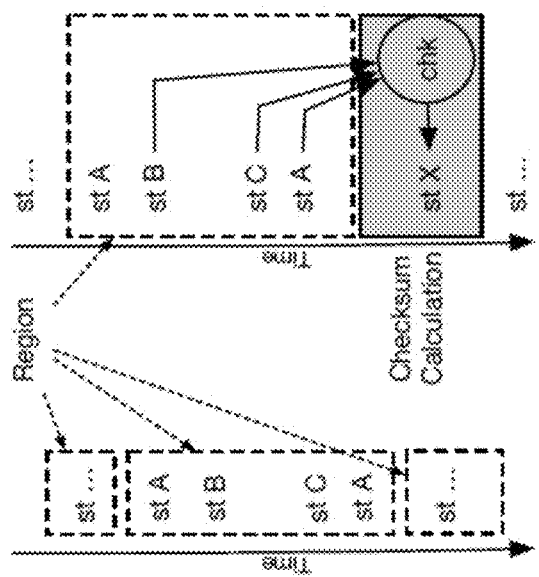
FIG. 5B
FIG. 5A

```
1   for (kk=starting_kk; kk<n; kk+=bsize) {
2     for (ii = starting_ii ; ii <n; ii+=bsize) {
3       ResetCheckSum();
4       for (jj=0; jj <n; jj+=bsize) {
5         for ( i=ii ; i <(ii+bsize); i++) {
6           for (j=jj ; j <(jj+bsize); j++) {
7             sum = c[i][j];
8             for (k=kk; k <(kk+bsize); k++)
9               sum += a[i][k]*b[k][j];
10            c[i][j] = sum;
11            UpdateCheckSum(c[i][j]);
12          } //end of for j
13        } //end of for i
14      } //end of for jj
15      hashIndex = GetHashIndex(ii,kk);
16      HashTable[hashIndex] = GetCheckSum();
17    } //end of for ii
18  } //end of for kk
```

FIG. 8

```
1  for (kk=last_kk; kk>=0; kk-=bsize) {
2     // decide the correct kk loop
3     for (good_ji=0;good_ji<N;good_ji+=bsize){
4        if (IsMatchingChecksum(good_ji,kk)){
5           for (ii=0; ii<n; ii+=bsize) {
6              if (!IsMatchingChecksum(ii,kk)){
7                 Repair(ii,kk);
8              }
9           } // end of for ii
10          // start from the beginning of next kk loop
11          starting_kk=kk+bsize;
12          starting_ji=0;
13          goto NormalExecutionMode;
14       } // end of if statement
15    } // end of for good_ji
16 } // end of for kk
```

FIG. 9

```
1   for (kk=0; kk<n; kk+=bsize) {
2     for (ii=0; ii<n; ii+=bsize) {
3       for (jj=0; jj<n; jj+=bsize) {
4         for (i=ii; i<(ii+bsize); i++) {
5           for (j=jj; j<(jj+bsize); j++) {
6             sum = c[i][j];
7             for (k=kk;k<(kk+bsize); k++)
8               sum += a[i][k]*b[k][j];
9             c[i][j] = sum;
10          } //end of for j
11        } //end of for i
12      } //end for jj
13      for (r=0; r<n; r+=CLELEMENTS)
14        CLFLUSHOPT(&c[i][r]);
15      }
16      SFENCE;
17      lastPersistedI = ii;
18      CLFLUSHOPT(&lastPersistedI);
19      SFENCE;
20    } //end of for ii
21    lastPersistedKKLog = lastPersistedKK;
22    CLFLUSHOPT(&lastPersistedKKLog);
23    SFENCE;
24    insideTxKK = true;
25    CLFLUSHOPT(&insideTxKK);
26    SFENCE;
27    lastPersistedI = -bsize;
28    lastPersistedKK += bsize;
29    CLFLUSHOPT(&lastPersistedI);
30    CLFLUSHOPT(&lastPersistedKK);
31    SFENCE;
32    insideTxKK = false;
33    CLFLUSHOPT(&insideTxKK);
34    SFENCE;
35  } //end of for kk
```

FIG. 16A

```
1   //Step1: Zero out the cells we will recompute.
2   firstB = lastPersistedB ;
3   lastB  = lastPersistedB +bsize;
4   for(i= firstB ; i< lastB ; i++) {
5       for(j=0; j<n; j++)
6           c[i][j] = 0;
7   }
8   //Step2: Fix cells we failed while computing.
9   //Recompute until the kk loop in which we failed
10  for (kk=0;kk<=lastPersistedKK; kk+=bsize) {
11      for(jj =0; jj<n; jj+=bsize) {
12          for(i= firstB ; i< lastB ; i++) {
13              for(j= jj ; j<(jj+bsize); j++)
14                  Perform_Multiplication(i,j)
15          }
16      }
17  //Step3: Make the recomputed cells durable
18  for(i= firstB ; i< lastB ; i++) {
19      for(j=0; j<n; j+=CLELEMENTS)
20          CLFLUSHOPT(&C[i][j])
21  }
22  SFENCE;
```

FIG. 16B

```
1  #pragma NVM recompute persist(c[ii: ii+bsize-1][0:n-1], ii)
2  for (kk = 0; kk < n; kk += bsize) {
3    for (ii = 0; ii < n; ii += bsize) {
4      for (jj = 0; jj < n; jj += bsize) {
5        for (i = ii; i < (ii+bsize); ii++) {
6          for (j = jj; j < (jj+bsize); jj++) {
7            sum = c[i][j];
8            for (k = kk; k < (kk+bsize); kk++) {
9              sum += a[i][k]*b[k][j];
10           }
11           c[i][j] = sum;
12         } // j
13       } // jj
14     } // ii
15   }
16 } // kk
```

FIG. 18A

```
1  // CLSIZE: cache line size in byte
2  // CLELEMENTS: Elements per cache line
3
4  for (l=ii; l<(ii+bsize); l++) {
5    offset = &c[l][0] & (CLSIZE-1);
6
7    if(offset == 0){
8      r1 = 0; // it is already aligned
9    }else{
10     r1 = offset / sizeof (c [0][0]);
11     CLFLUSHOPT(&c[l][0]);
12   }
13
14   for (r=r1; r<n; r+=CLELEMENTS)
15     CFLUSHOPT(&c[l][r]);
16 }
```

FIG. 18B

METHODS OF CRASH RECOVERY FOR DATA STORED IN NON-VOLATILE MAIN MEMORY

CROSS-REFERENCE TO RELATED APPLICATIONS

This non-provisional application is a continuation of and claims priority to provisional application No. 62/728,478, entitled "Methods of crash recovery for data stored in non-volatile main memory," filed Sep. 7, 2018 by the same inventors, the entirety of which is incorporated herein by reference.

FEDERALLY SPONSORED RESEARCH OR DEVELOPMENT

This invention was made with Government support under Grant No. 171748 awarded by the National Science Foundation. The government has certain rights in the invention.

BACKGROUND OF THE INVENTION

1. Field of the Invention

This invention relates, generally, to methods of crash recovery. More specifically, it relates to improvements in methods of writing and backing up data in non-volatile main memory, such that in the event of a crash, a system does not have to expend large amounts of energy rewriting data that was lost as a result of the crash.

2. Brief Description of the Prior Art

When a computer system crashes, or there is a fault in the system, the data stored in volatile memory sources is lost. Computer systems are designed to include restore points to reduce the need for the system to repeat a writing process from the beginning each time a fault occurs. These restoration systems are aimed at accomplishing fault tolerance to limit the damage and time losses associated with crashes. The traditional approach to achieve fault tolerance is the Checkpoint/Restart (C/R) approach. In C/R, the computational state of the machine that constitutes a full checkpoint, such as a system identifier, a register file, and the address space, are saved periodically to stable storage media. When a machine crashes and subsequently restarts, it restores the checkpoint by copying the saved structures back into memory before the machine can resume execution. Since the failure usually occurs between checkpoints, some work must be re-run to recover the state of the system back to the point of the failure. A key disadvantage of the C/R approach is its significant performance overhead [1]. C/R overhead can be reduced in many ways. For example, checkpoints can be compressed [2] to reduce the time to write them to storage. Faster secondary storage options, like non-volatile memory (NVM) [3], [4], can reduce the overhead of copying checkpoints. Multi-level checkpointing [5] can reduce the frequency and overhead of copying checkpoints to slower disk-based storage. However, C/R still poses significant overhead.

Application-Level Checkpointing (ALC) provides an improvement over C/R. ALC exploits the observation that most iterative scientific applications have certain key data structures or variables from which the computational state of the program can be recovered and resumed. For example, in order to restore an n-body application, only the positions and velocities of all the particles must be saved; therefore, ALC would checkpoint only these key data structures in each checkpoint [6]. Programmer instrumentation is needed to determine good points in the program to save a checkpoint of the key data structures or variables. The ALC approach has two main advantages over C/R. First, it is not machine or operating system (OS) specific. Second, it can significantly reduce the amount of checkpointed data by saving only the necessary data. Reducing the data copied to secondary storage significantly improves the execution time overhead and reduces the memory needed to take the checkpoint compared to C/R approach [6].

Non-volatile memory technologies have been advancing rapidly, and some of them are a strong contenders for use as a future main memory, either for augmenting or replacing DRAM (dynamic random-access memory). One such an example is 3D Xpoint™ memory, which was brought to market in 2017 by Intel and Micron [7]. These new non-volatile main memory (NVMM) technologies are byte-addressable and have access latencies that are not much slower than DRAM [7], [8], [9], [10], [11], [12], [13], [14]. NVMMs are expected to have a limited write endurance, making it imperative to keep the number of writes low [15]. Despite the limited write endurance and relatively high write latency compared to DRAM, NVMM's density and cost advantage over DRAM and near-zero idle power consumption make them a compelling candidate to replace or augment DRAM in high performance computers [16].

At the same time, as high-performance computing (HPC) relies on an increasing number of nodes and components, it becomes increasingly likely that long-running computation will be interrupted by failures before completing. As discussed above, frequent checkpointing has become essential because it allows applications to resume from a recent snapshot rather than re-execute from the beginning. Moreover, checkpointing overheads can be lowered when using NVM [3] to hold checkpoint states, since NVM write latency is lower and write bandwidth is higher than hard drives or solid-state drives (SSDs). However, in this context, NVM is simply treated as a faster secondary storage.

Accordingly, what is needed is a method of recovering system data in the event of a crash or failure that greatly reduces recovery time and overhead, without greatly increasing the amount of system energy required to create checkpoints. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a method of recovering system data in the event of a crash or failure that greatly reduces recovery time and overhead is now met by a new, useful, and nonobvious invention.

The novel method includes the step of providing a set of instructions organized into a plurality of regions. At least one of the plurality of regions is a recovery unit, and at least another is an error checking unit. The recovery unit includes written data to be transferred to a non-volatile main memory. The error checking unit is adapted to summarize the written data in the recovery region into a value. In an embodiment, the plurality of regions are idempotent.

The method includes the steps of reading, via the error checking unit, the written data from the recovery unit and calculating a first value that includes a baseline value of the written data. At least a portion of the written data is transferred from the recovery unit to the non-volatile main memory via natural cache evictions, such that the at least a portion of the written data is transferred in the background and not actively pushed to the non-volatile main memory, thereby reducing computing costs associated with the data transfer.

The transferred portion of written data is read within the non-volatile main memory and the error checking unit calculates a second value. The second value includes a value of the written data transferred from the recovery unit to the non-volatile main memory. The second value is compared with the first value, and a determination that the values do not match indicates a failure occurred, thereby necessitating system recovery. In the event that a failure occurred, the method includes the step of executing a recovery code to perform the system recovery. The recovery code is adapted to read through the plurality of regions in reverse order to determine when the failure occurred by comparing the written data from the non-volatile main memory with the written data from the recovery unit, such that the system does not require a step of logging data to create a checkpoint. The method may repeat with a second of the plurality of regions.

In an embodiment, each of the plurality of regions is associated with the other regions. As such, the plurality of regions may transferred to the non-volatile main memory out of order based on an order of the transfer of written data to the non-volatile main memory. In another embodiment, the plurality of regions are not associated with each other, and the step of transferring at least the portion of the written data from the recovery unit to the non-volatile main memory via natural cache evictions includes the step of transmitting the written data for each cache line of the set of instructions.

A further step includes identifying a failure point within the plurality of regions during the step of executing the recovery code. Any values associated with the written data after the failure point are reset, and the method includes the step of recalculating the reset values associated with the written data until the first value matches the second value.

In an embodiment, the method is performed on one or more non-transitory tangible computer-readable media having computer-executable instructions by running a software program on a computer, the computer operating under an operating system. In this embodiment, the method includes issuing instructions from the software program to save and recover data with the instructions outlined above.

An object of the invention is to simplify and improve the accuracy of data recovery in the event of a system crash or a failure to persist data, while decreasing recovery time and computing overhead, without greatly increasing the amount of system energy required to persist data.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 1 is an illustration of Lazy Persistency code.

FIG. 2 is an illustration of a durable transaction with Eager Persistency.

FIG. 4 is an illustration of tiled matrix multiplication code.

FIG. 5A depicts an example of the formation of three regions according to a Lazy Persistency method.

FIG. 5B is an illustration of a checksum calculation within region X for each of the regions of FIG. 5A.

FIG. 5C is an illustration of a detection and recovery mechanism for the regions depicted in FIG. 5B.

FIG. 8 is an illustration of the tiled matrix multiplication code of FIG. 4 with Lazy Persistency.

FIG. 9 is an illustration of a recovery code for the tiled matrix multiplication code of FIG. 8.

FIG. 16A is an illustration of a normal execution code for tiled matrix multiplication using the Recompute system described herein.

FIG. 16B is an illustration of recovery code for tiled matrix multiplication using the Recompute system described herein.

FIG. 18A is an illustration of a tiled matrix multiplication code augmented with a compiler directive.

FIG. 18B is an illustration of the transferred code resulting from the augmentation shown in FIG. 18A, employing loop peeling to handle unaligned matrices to ensure only one CLFLUSHOPT instruction is used for each cache block.

DETAILED DESCRIPTION OF THE INVENTION

Figure 3:
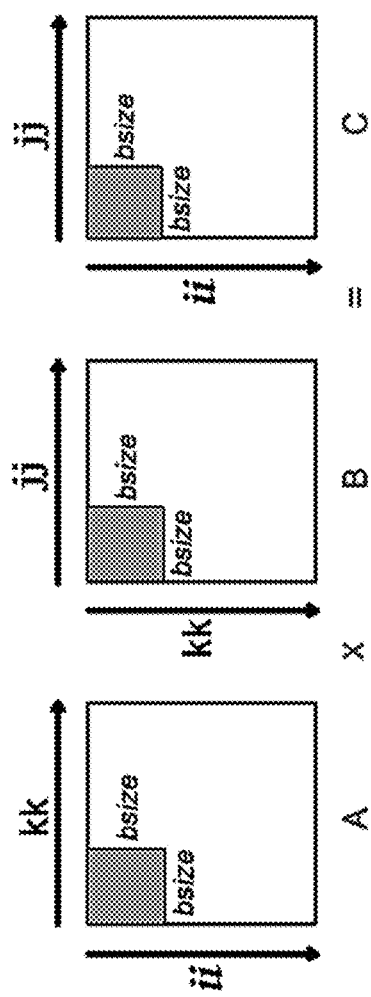
FIG. 3 depicts an example of tiled matrix multiplication.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

NVMM offers new opportunities to reconsider how failure safety can be achieved, because the main memory can now hold the persistent state of a program, thereby serving the same role as a checkpoint. With NVMM, a consistent state can be constructed in-place in the NVMM utilizing the working data structures used by the applications. Consequently, only very minimal additional states beyond what the program already saves to memory need to be recorded. A common approach to in-place checkpointing is logging, where modifications to key data structures are made durable at a transaction granularity. If the programmer wraps changes that need to be durable together in a transaction, data structures can always be in a consistent state. Durable transactional logging has been applied to the file system (e.g. BPFS [17]), heap (e.g. NV-HEAPS [18], NVML [19], and Mnemosyne[20]), and linked data structures (e.g. [21], [22], [23]). In an embodiment of the present invention, logging was implemented via an INTEL® persistent memory (PMEM) instruction extension [19] on a machine model built on gem5, and tiled matrix multiplication performance was measured. The implementation reduces the execution time and write overheads compared to ALC: 8% vs. 207% execution time overheads, and 111% vs. 330% additional NVMM writes. While this represents much improvement in execution time overheads, the write overheads remained high, and it was desirable to seek further improvement.

As such, a new Recompute approach is presented, which removes the log entirely and allows state to become inconsistent. Some of the result matrix could become or appear inconsistent at the point of failure. However, additional information was tracked so that the possibly inconsistent state and re-run computation can be discarded as needed. Recompute has the interesting property of being restore-free, in that no checkpoint needs to be copied back to memory or consistent state restored using a log. The Recompute approach is demonstrated on loop-based codes that are essential in HPC workloads, and presented in detail for matrix multiplication. Loop-based code is important to study, because loop-based code requires the consideration of optimizations, such as tiling, in studying the Recompute method.

Recompute achieves failure safety with almost no penalty in execution time and write endurance. For tiled matrix multiplication, Recompute has an execution time overhead of only 5% compared to an unmodified version of the kernel, while adding only 7% write overhead. Across various workloads, the geometric mean execution time overhead ratio is 1.03× for Recompute vs. 1.91× for traditional checkpointing, and the write overhead ratio is 1.08× for Recompute vs. 1.38× for traditional checkpointing.

Example 1

Prior to the proposed method, there have been recent attempts to provide a fault tolerant algorithm thereby creating persistent memory, which may be referred to as Eager Persistency, and is exemplified by the INTEL® PMEM platform. PMEM provides several instructions, such as cache line write back (clwb) and optimized cache line flush (clflushopt), in addition to existing x86 instructions, such as cache line flush (clflush) and store fence (sfence). With PMEM, programmers must explicitly flush a cache block written to by a store instruction in order to force the store to become durable. A store fence is needed afterward to avoid subsequent stores (younger stores) from becoming durable before preceding stores (older stores). Thus, a store fence has two roles: it acts as memory barrier that ensures older stores are visible to other threads, and it acts as a durable barrier that ensures older stores (including cache line flush or write back instructions) are durable prior to younger stores. The latter role is made possible by a recent Asynchronous DRAM Refresh (ADR) platform specification which requires the write buffer in the memory controller (MC) to be in the non-volatile domain. Thus, when a dirty block (i.e., a modified and unsaved block of data) is flushed out of the cache hierarchy into the MC, it can be considered durable. Prior to ADR, the MC write buffer is not in the non-volatile domain, hence another instruction (pcommit) is needed to flush the MC write buffer to NVMM before a store is durable. Note that PMEM does not provide a primitive to specify a durable atomic region. Hence, programmers need to create their own atomic durable region in software, e.g. through software write-ahead logging or other logging mechanisms. FIG. 1 illustrates the high cost of the PMEM model.

FIG. 2 shows a PMEM implementation of a durable transaction. The example assumes that each loop iteration body forms a durable transaction. While loop iteration body provides a natural durable transaction granularity and is used for ease of illustration, other granularities are also possible. Lines 2-7 show the creation of log entries for C[i], D[i], and last i, their cache line flushes, and a durable barrier that ensures the log creation is complete prior to the next step of setting logStatus to indicate the completion of log creation (Lines 9). logStatus must also be made durable prior to modifications to the actual data (Lines 12-14). Lines 15-18 show results being written to C[i], D[i], and the loop index last_i are persisted. When that is completed, the log is no longer needed and hence can be marked appropriately (Lines 19-21). Note that four sets of cache line flushes and durable barriers are needed to implement one durable transaction.

While several benchmarks may be used for evaluating the proposed method, discussed in greater detail below, matrix multiplication is used to illustrate the method without loss of generality. The examples provided in FIGS. 3-4 multiply matrix a with matrix b and store the result into matrix c. All matrices are square and have n×n size. FIGS. 3-4 illustrate a tiled matrix multiplication and show its code, respectively. Tiling is a common cache optimization for improving temporal locality of matrix-based kernels. For the matrix multiplication, assuming that bsize is the tile size, a standard 6-loop tiling [9] is assumed which splits all the three matrices into tiles of bsize×bsize elements. The tiled matrix multiplication (tmm) code consists of 6 loops (from outer to inner): kk, ii, jj, i, j, and k. The outermost kk loop splits matrices a and c into vertical groups, each consisting of bsize columns. kk loop splits the b matrix into several bsize rows-width horizontal groups. The ii loop splits a horizontally. The intersection between the split caused by ii and kk results in squares of bsize×bsize tiles (FIG. 3). Similarly, the ji loop splits each of matrix b's horizontal kk groups into square bsize×bsize tiles. The innermost loops i, j, and k, perform partial matrix multiplication for a tile and accumulate the partial result into the c matrix elements within the tile.

Returning now to the proposed method, which may be referred to as Lazy Persistency (in contrast to the Eager Persistency methods discussed above), the proposed Lazy Persistency (LP) method requires that a programmer organize an algorithm, or a set of instructions, into LP regions, where each region is a unit of recovery. Since Lazy Persistency relies on natural cache evictions to lazily write back data rather than eagerly flushing data to NVMM, a user cannot be absolutely sure that all data becomes durable before a failure. To determine if all data in a region became durable prior to a failure, the proposed method leverages an error checking code in software. The error checking code is meta-data that the program will compute and maintain. The meta-data may be referred to as a checksum for the rest of this detailed description.

FIG. 5A illustrates code divided into three LP regions. Each region contains a set of stores to persistent memory. For the stores in this region, a checksum calculation is added to the program that summarizes the content of all the written data. In the figure, the middle region has four stores (to A, B, C, and A). FIG. 5B shows the addition of checksum calculation (X) based on all the last store values for each address, and a store that writes it to persistent memory. The programmer (either directly or through a library) adds such a checksum calculation for all regions as well as a location in memory to hold all of the checksums. If a failure occurs during or after this region, some of the writes (A, B, or C) or the checksum (X) may fail to become durable. To detect this case, data from relevant memory locations (A, B, and C) is read; only store values that became durable prior to the failure are read out from the NVMM, other values were lost. A checksum is then calculated from the read data and compared against the saved checksum. If they mismatch, then some of the data or the checksum failed to persist before the failure. In this case, an inconsistent state is detected, and the system must recover. This checking procedure is illustrated in FIG. 5C. Note, the checksum must only include the final data written to a memory location in a region, otherwise a recomputed checksum is certain to fail. That is why only the last write to A is shown as part of the checksum in FIGS. 5B and 5C. If a region is found to be inconsistent with its checksum, a recovery action must be invoked. Recovery mechanisms are region and workload dependent, and the programmer must implement a suitable recovery approach for each region.

Table I compares Lazy vs. Eager Persistency. Essentially, Lazy Persistency achieves fast normal (failure-free) execution at the expense of slower and more complex recovery. During normal execution, Lazy Persistency does not require explicit cache line flushes and durable barriers, because it relies on normal cache evictions. Furthermore, no atomic durable regions (or durable transactions) are needed in Lazy Persistency. However, to detect persistency failure, it needs to calculate and maintain a checksum in software. The checksum presents a small write amplification overhead since multiple values can rely on just one checksum. In contrast, Eager Persistency incurs much higher write amplification because there is more meta-data to write (i.e. the logs), and data is flushed early, preventing coalescing of multiple writes to different parts of the same cache block. Recovery is more complex with Lazy Persistency, because programmers need to construct recovery code.

TABLE I

Comparing Eager Persistency vs. Lazy Persistency

| Aspect | Eager Persistency | Lazy Persistency |
|---|---|---|
| CL Flushes | Needed | — |
| Durable barriers (fences) | Needed | — |
| Logging | Needed | — |
| Error detection | Checking Log's state | Software checksum |
| Write amplification | High (from logging and flushes) | Low (from checksum) |
| Execution time overheads | High (extra instructions and pipeline stalls) | Low (checksum computation) |
| Recovery overheads | Low (persistency region) | High (checksum validation and recomputation) |

Figure 6:
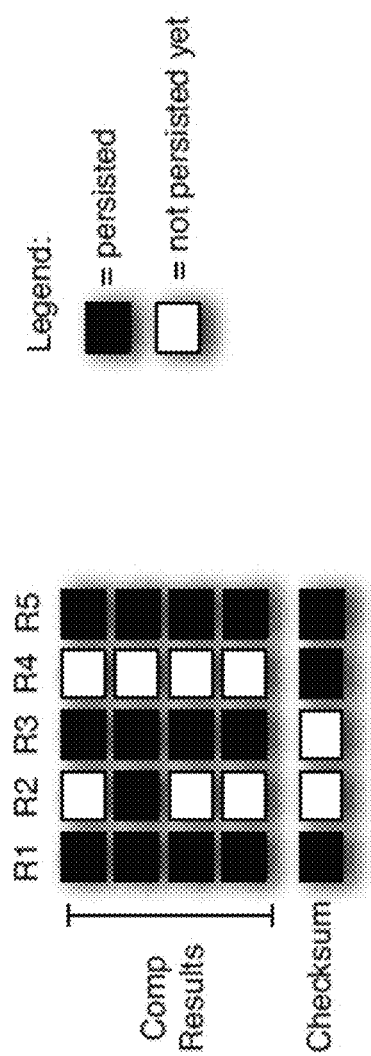
FIG. 6 is an illustration of the progress of Lazy Persistency regions, depicting whether the regions were persisted.

One requirement for using Lazy Persistency is that regions must be associative with respect to others. With Eager Persistency, they will be performed and persisted one after another. With Lazy Persistency, they may be persisted out of order, depending on which computation results and checksums are evicted from the cache first. FIG. 6 illustrates this difference in persistence between Lazy Persistency and Eager persistency. The illustration provided by FIG. 6 includes five regions, R1-R5. Each region stores four computation results and a checksum. For R1 and R5, all results and checksums are persisted. For R2, only a few results are persisted. For R3, only the results are persisted. For R4, only the checksum is persisted.

If a failure occurs, then R1 and R5 are not recomputed because they were fully persisted. However, R2, R3, and R4 are recomputed. After recomputation, the order of computation is R1, R5, R2, R3, and R4. This is different than the original order of R1-R5. The overall computation result must be the same with both orders, requiring that each region is associative with respect to all others. A necessary (but not sufficient) requirement for associativity is that there cannot be data dependencies between regions, be they true or false (anti or output) dependencies. However, the scope of Lazy Persistency can be expanded further. For example, false dependencies can be removed through code transformation. Furthermore, some false dependencies may be permitted, depending on the recovery code complexity.

With loop-based computations, loop bodies are typically good candidates for LP regions. It is often easy to find loop iterations that are associative and have no loop-carried dependences. With loop bodies, the granularity of parallelization and persistency regions may coincide. However, there are typically multiple loops that are associative, hence multiple choices of granularities for the LP regions.

The granularity of an LP region must be chosen carefully while weighing the overhead and reliability of the checksum calculation. Consider that each region has a corresponding checksum calculation. The cost of a single checksum is small, but it is incurred for all regions. Hence, smaller regions may aggregate a larger total cost for checksum computation than larger regions. Granularity also affects recovery after a failure. Larger regions imply more lost work that must be recomputed when the checksum does not match. In the extreme, a very large region may require computation time that approaches the mean time to failure (MTTF), making it difficult to guarantee forward progress. At the same time, the checksum for a large region protects more data. For larger regions, the likelihood of false-negatives increases. To compensate, larger regions may need stronger error detection mechanisms that are costlier. A choice of good LP region granularity takes into account all of the above considerations.

There are several aspects to consider for error detection. One aspect is whether the checksum computation itself should adopt Eager or Lazy Persistency. Another important aspect is what error detection code should be employed. For the persistency approach, at each LP region, a checksum must be calculated. After the checksum is calculated, with an Eager approach, the checksum can be persisted immediately, e.g. using cache line flush and store fence. An advantage of this approach is that the checksum is always durable. However, one disadvantage is a higher associated costs for Eager Persistency, which includes cache line flushes, durable barriers, and write amplification.

If Lazy Persistency is chosen for the checksum, the checksum calculation itself does not incur any Eager Persistency costs. However, a false negative situation is possible, in which computation in a region is persisted correctly but is misidentified as a persistency failure. Region R3 in FIG. 6 illustrates this. With R3, the computation result is fully persisted, but the checksum is not persisted yet, so recovery will recompute this region unnecessarily. Considering that failures arise due to power failure or software crashes, the failure rate will be quite low, and therefore the Lazy Persistency approach is chosen for the checksum, just as for computation results.

Another aspect of error detection design is what type of checksum to use. Choosing a checksum involves a trade-off between accuracy and execution time overhead. Accuracy refers to the likelihood that the checksum suffers a false positive, in which the computation results are not fully persistent but the checksum matches anyway. While unlikely, it is possible for an error checking code to produce the same value for two different data sequences. Such cases must be exceedingly rare for Lazy Persistency to work properly. Hence, a low overhead technique that is also highly accurate is needed.

Figure 7B:
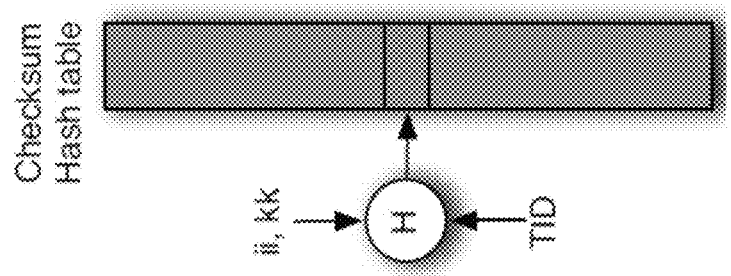
FIG. 7B depicts an example of a checksum organization in a standalone structure.
Figure 7A:
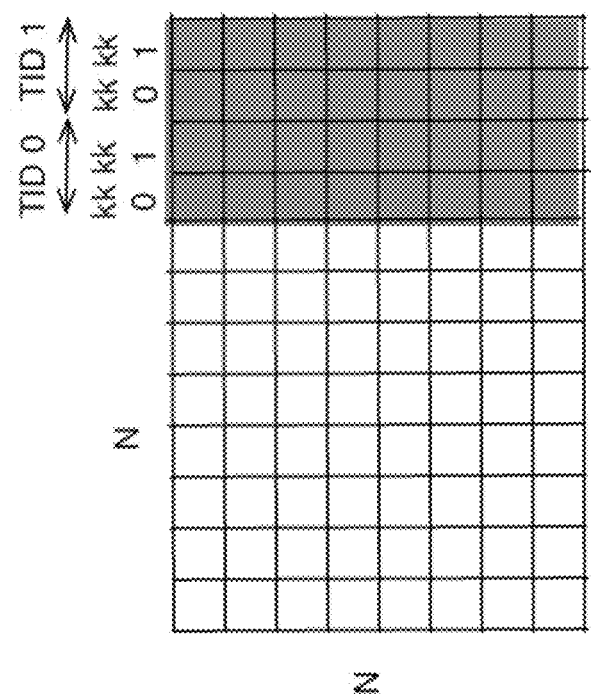
FIG. 7A depicts an example of a checksum organization embedded into a data structure.

Another important design aspect is the checksum organization. Checksums can be embedded into the data structure or stored in a standalone structure. FIGS. 7A-7B illustrate both approaches. Consider a tiled matrix multiplication where the output is an N×N matrix. FIG. 7A shows few columns added to the matrix. Assuming that each LP region is a kk loop body, there are $$\frac{N}{bsize}$$

kk regions per thread, where bsize is the blocking factor, with each region and each thread needing their own checksum. Thus, with P threads, the number of checksum columns is $$\frac{N}{bsize} \times P.$$

With N rows, the total space overhead is high, at $$\frac{N^2 P}{bsize}.$$

Furthermore, since the data structure is directly modified, it results in high programming complexity, and complicates some compiler optimizations that deal with matrix layout. Thus, an alternative approach is utilized, in which the checksum is stored in a standalone structure, a hash table (FIG. 7B). Programmers call the cksum(key, val1, val2, ... ) function, supplying a unique key that identifies the LP region being hashed, and all values to be protected by the checksum. For tiled matrix multiplication, the key is a combination of ii, kk, and thread ID. The hash function and hash table size are adjustable depending on the space target and tolerance for hash collisions. In the case of the present invention, the table size is chosen to be $$\frac{N}{bsize} \times \frac{N}{bsize} \times P = \frac{N^2 P}{bsize^2},$$

and ii, kk, and thread ID form the key. The design eliminates bsize bsize bsize2 hash collisions. Since each checksum is 32 bits wide, the total space overhead for the hash table is 1% of the size of the matrices.

After a failure and upon detection of a mismatch between a checksum and a region, a recovery action is needed to restore the region's data to a consistent state. Recovery is code dependent, but there are special cases which make its construction trivial. One special case is when an LP region is idempotent. An idempotent region [17] is a code region that can be executed multiple times without changing the output of the program. Idempotent regions can be identified through compiler analysis [18]. If the regions coincide with LP regions, the recovery code can be trivially constructed since it is identical to the region code itself. For non-idempotent regions, recovery is program specific.

Two recovery styles are possible: Eager or Lazy. Lazy Persistency is possible for the recovery code. However, one concern is that persistency failure can occur during recovery, triggering recovery of the recovery code. Thus, Eager Persistency is chosen for the recovery code, to ensure forward progress. Even though Eager Persistency is expensive, it is applied for the recovery, which is the rare case.

It is possible that a dirty block containing either a result or a checksum from a very old region stays in the cache for a long time, especially if the cache size is very large. This can possibly make the recovery time unbounded with Lazy Persistency. To provide an upper bound on recovery time, we can employ a periodic cache cleanup; where after N regions are executed or after T amount of time elapsed, all dirty blocks are written back (but not evicted). The cache cleanup can be controlled by software (through executing a cache cleanup instruction), or performed atomically in hardware. With the latter, the hardware cache cleanup logic can space out write backs to avoid bursty writeback traffic, similar to how DRAM-refreshes to different rows are spaced apart in time. More elaborate hardware schemes are possible.

FIG. 8 shows tiled matrix multiplication code from FIG. 4, modified for Lazy Persistency. The LP region is an ii iteration. A larger or smaller region granularity is possible. However, the largest granularity (kk iteration) is too large; failure may trigger nearly the entire matrix multiplication to be repeated. Smaller granularities (jj, i, or j iterations) are also possible, but a larger region granularity was chosen to keep the checksum overheads low.

As shown in the figure, supporting Lazy Persistency can be achieved by adding only a few lines of code to the original code. The additional code includes resetting the checksum when we enter a new LP region, i.e. a new ii tile (Line 3). Then, the local checksum is updated to include the newly generated data in c[i][j]. If the checksum uses modular (or parity) checksum, the update is as simple as adding (or XORing) the new value c[i][j] with the running checksum. After finishing all the operations for the current LP region, and before exiting the ii loop, the final running checksum value is stored into the hash table (line 15-16). Due to the simplicity of code transformation, Lazy Persistency can be added through a compiler pass.

The code in FIG. 8 shows a sequential mode with one thread. For a parallel mode with multiple threads, the only change needed is to declare the checksum variable as thread private. For the hash table, since a key includes the threadID, different threads will access different parts of the hash table, hence no critical section (and locks) are needed to protect the hash table entries. If a smaller hash table is used where threads may collide on a single hash table entry, locks are needed to protect hash table entries. A collision-free hash table design was chosen, since such a design only occupies 1% the space of the matrices, while not requiring locks.

When recovering from a failure, the system runs the recovery code shown in FIG. 9. Note that for matrix multiplication, LP regions within a kk are associative, but across different kk's are not associative due to output dependences. A straightforward implementation requires Lazy Persistency to be applied only within one kk iteration. However, as shown in the figure, the associativity requirement is relaxed by designing recovery code that systematically loops over all the checksums in reverse program order, indexed by the kk and ii. Reverse order is necessary because each kk modifies the C matrix, hence there are output dependences across kk iterations. Once a computed checksum that matches the stored checksum (line 4) is determined, the system indicates that at least one of the blocks within this kk tile persisted successfully prior to the failure, hence repair is triggered (line 7) for all ii at the given kk.

The repair is accomplished by recomputing the tile using the input matrices. All intermediate values that were stored in the inconsistent tile(s) are zeroed out and filled with the computation result from matrix multiplication for this tile, from the beginning until the kk preceding the one that starts normal execution. Note, the repair function can be optimized to make recovery quicker. Instead of assuming that recovery must start from the beginning, a prior kk iteration for the same ii block can be identified that does match its checksum. If one exists, the difference can be computed rather than recomputing from the beginning.

Another case that must be handled is when the checksum does not receive an initial value during the normal execution phase, which can occur because the program did not reach the corresponding iteration before the failure. Detecting the case can be achieved by initializing each checksum to an invalid value, such as NaN (Not-A-Number), or a value that programmers know that matrix values will not use, such as "−1" for matrices that only have positive numbers and zeroes.

For evaluation, a simulator that is built on top of the gem5 simulator [19] is used. Gem5 is an open source simulator which provides cycle-accurate full system simulations. Table II shows configuration parameters used in the evaluation. The ×86-64 instruction set architecture (ISA) was used. The simulator models a processor with 2-17 cores. Each core has a 4-way out-of-order pipeline. It builds a memory hierarchy model on top of Ruby [20]. Each core has a private L1 cache, and an L2 cache shared by all cores. While cache size tends to go up with number of cores in a balanced system, in the present invention the cache size is fixed so that the effect of increasing the number of threads independently from the total L2 cache size can be isolated. Coherence among these caches is maintained through a MESI two-level coherence protocol. The default access latencies for the NVMM are 150 ns for read and 300 ns for write.

TABLE II

Machine configuration used in evaluation

| Component | Configuration |
| --- | --- |
| Processor | 2-17 cores (default 9), each OoO, 2 GHz, 4-wide issue/retire ROB: 196, fetchQ/issueQ/LSQ: 48/48/48 |
| L1I and L1D | 64 KB, 8-way, 64B block, 2 cycles |
| L2 | 512 KB, 8-way, 64B block, 11 cycles |
| MC | ReadQ/WriteQ: 32/64, ADR |
| NVMM | Latencies: 60-150 ns read (default 150 ns), 150-300 ns write (default 300 ns) |

To support Eager Persistency, the clflushopt instruction from INTEL® PMEM was implemented [21].

In addition to the evaluation on gem5 simulator, Lazy Persistency is evaluated on a real system (shown in Table III). That Lazy Persistency does not require any hardware support made it possible to evaluate it on any real systems, in contrast to Eager Persistency techniques. The system is DRAM-based since no NVMM-based systems are available commercially yet. Thus, only execution time overheads were measured, and the persistency aspects were ignored.

TABLE III

Real system used in evaluation

| Component | Configuration |
| --- | --- |
| Processor | 32 CPUs, AMD Opteron ™ Processor 6272, 2.099 GHz |
| L1I and L1D | 16 KB and 64 KB, respectively. 64B block |
| L2 | 2048 KB, 64B block |
| L3 | 6144 KB, 64B block |
| Main Memory | 32 GB DRAM |

For evaluation, several schemes were compared, as shown in Table IV. The focus of all of the evaluation was on tiled matrix multiplication, but other benchmarks were evaluated using a subset of the schemes and configurations. These kernels are heavily used in HPC and machine learning. For example, the convolution layer of deep neural network contributes to about 90% of the execution time [22], [23]. In the table, base (tmm) represents a standard tiled matrix multiplication without failure safety. tmm+LP represents the Lazy Persistency methods described herein.

TABLE IV

Various approaches tested for tiled matrix multiplication. The matrix dimension used is 1024 × 1024, and the tile size is 16, which allows one stride to be persisted using only one clflushopt

| Variant | Description |
| --- | --- |
| base (tmm) | Tiled matrix multiplication without failure safety |
| tmm + LP | Lazy Persistency (ii granularity) |
| tmm + EP | Eager Persistency (ii granularity) |
| tmm + WAL | Transaction with Logging (ii granularity) | tmm+EP represents the state-of-the art Eager Persistency scheme called Recompute [25]. EagerRecompute is an application level in-place checkpointing that was shown to perform substantially better in terms of performance and write amplification for scientific applications, when compared to other well-known schemes such as Checkpoint and Restart (C/R) and write-ahead logging with PMEM [25]. With EagerRecompute, programs are allowed to be in an inconsistent state during a transaction. A transaction covers a single tile in a tiled matrix multiplication. It persists computation as it goes in a semi-consistent manner. There is no guarantee of precisely consistent state at any given time during execution. When failure occurs, computation is rolled back to the last known state, any state for which its consistency status is unknown is discarded, and recomputation is triggered. EagerRecompute reduces the execution time by relaxing the order of persists within a transaction. EagerRecompute relies on Eager Persistency by forcing the program to wait after finishing each tile until all data modified in the transaction is persistent.

tmm+WAL represents a failure-safe version achieved using durable transactions with write-ahead logging implemented using PMEM instructions. For accuracy, in all of tmm+EP, tmm+WAL, and tmm+LP, the same persistency region granularity is chosen, which is a single ii loop iteration. Unless otherwise indicated, the default experiment setup was to run the system on nine cores, with each benchmark running with eight threads plus one master thread.

In addition to the Tiled Matrix Multiplication (TMM), several other benchmarks were evaluated, including Cholesky Decomposition (Cholesky), 2-dimensional convolution (2D-conv), Gaussian elimination (Gauss), and Fast Fourier transform (FFT). Table V describes these benchmarks and the input used. These benchmarks are popular kernels in scientific computation. The implementation of these benchmarks is based on the SPLASH-2 suite [26], in addition to other resources such as [27], [28], [24].

TABLE V

Summary of the benchmarks evaluated

| Benchmark | Description |
| --- | --- |
| TMM | 1k-square input matrix multiplication |
| Cholesky | 1k-square input matrix Cholesky factorization |
| 2D-conv | 1k-square input matrix 2D convolution |
| Gauss | 4k-square input matrix gauss elimination |
| FFT | 100k nodes vector FFT |

For the real system evaluation, all workloads ran from start to completion. Simulation-based evaluation was performed over a fixed number of outer-loop iterations to ensure that each of the designs performs the same amount of work during simulation. For Tiled Matrix Multiplication, the simulation window was two iterations over the outer-loop (kk). This was equal to 1/32 of the run-time of the program. For Cholesky, the simulation time was feasible, so the kernel ran until completion, performing the 1 k-square matrix. In 2D-Convolution, each of the schemes ran for 5 iterations of the outer loop, which is about 4% of the running-time of the program. The simulation window for the Gauss benchmark is 4 iterations of the outer loop, which will pass over 4 columns. Finally, simulation window for the FFT benchmark is about 5% of the running-time of the program. These parameters were selected to ensure that 300 million instructions, on average, were simulated and timed. Note, the simulator warmed up for 250 million instructions, on average, in advance of these simulation windows.

Figure 10:
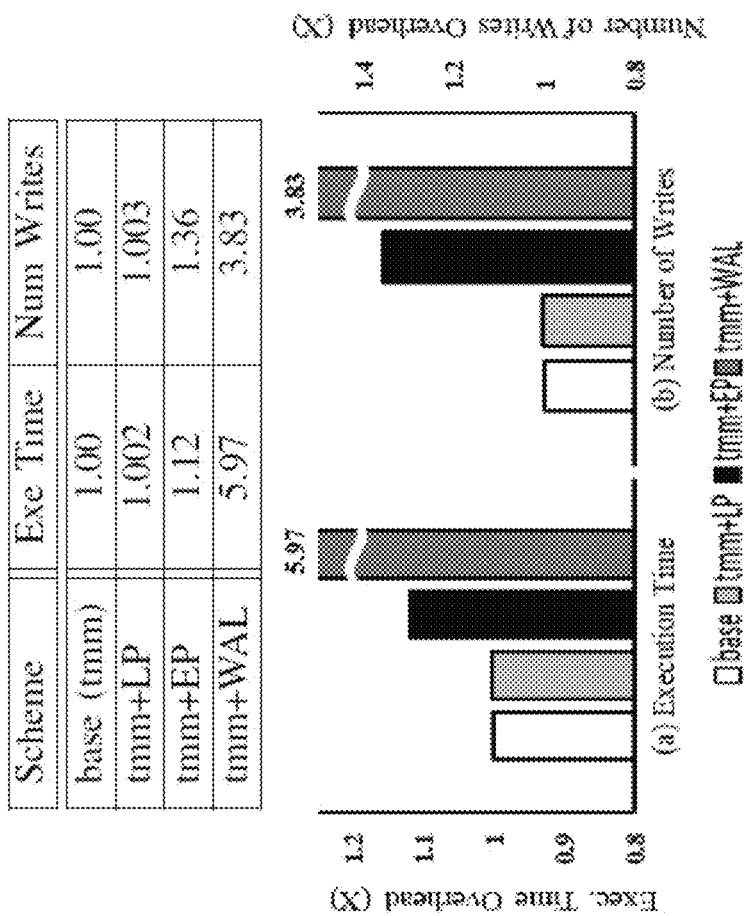
FIG. 10 is a graphical depiction of a comparison of write times and number of writes for the Lazy Persistency method, compared with Eager Persistency, write-ahead logging (WAL), and a base line value.

FIG. 10 shows the execution time and number of writes (write amplification), normalized to the base tiled matrix multiplication that is not failure safe. The number of writes includes the number of L2 writebacks due to regular cache evictions, plus any cache line flushes.

As can be seen in FIG. 10, using write-ahead logging (tmm+WAL) is the most expensive option, with execution time and write amplification of 5.97× and 3.83×, respectively. The state-of-the-art Eager Persistency technique, EagerRecompute [25], yields a considerable execution time and write amplification reduction compared to tmm+WAL. EagerRecompute's execution time and write amplification are 1.12× and 1.36×, respectively. However, these overheads are still high, especially the write amplification. The proposed approach, Lazy Persistency, provides superior results, bringing both the execution time and write amplification overheads to approximately 1%, more specifically 1.002× and 1.003×, respectively. The reason for the improvement provided by the proposed methods is that Lazy Persistency does not suffer from any cache line flushes, double barriers, or logging. The code is changed very little, with only the checksum calculation being added to the normal execution.

Note that tmm+WAL is an Eager Persistency scheme that is relatively more straightforward for the programmer to work on, but it incurs the highest performance and write amplification overheads. EagerRecompute is an Eager Persistency scheme that requires significant changes to the source code and requires recovery code, which incurs similar programming complexity compared to our Lazy Persistency. Thus, the small execution time and write amplification overheads achieved by Lazy Persistency only trades off longer recovery time in comparison to EagerRecompute.

To provide further analysis, the number of occurrences of instructions that cannot be issued due to a structural hazard was measured. The following hazards are considered: miss status holding registers full (MSHR), integer functional units full (FUI), and load and store queue full (FUR and FUW, respectively). Finally, L2 miss rate (L2MR) is collected. These results are shown in Table VI. In the table, in the first three numeric columns, all numbers are normalized to base (tmm). The next numeric column (FUW) contains very small numbers in some schemes so they are not normalized. The final numeric column (L2MR) is also not normalized for the same reasons.

TABLE VI

Various instances of pipeline hazards and L2 Miss rate for different schemes

| | Normalized to base | | | Non-normalized | |
| --- | --- | --- | --- | --- | --- |
| Scheme | MSH | FUI | FUR | FUW | L2MR |
| base (tmm) | 1.00 | 1.00 | 1.00 | 1 | 0.01 |
| tmm + EP | 1.84 | 21.57 | 22.4 | 31,109 | 0.05 |
| tmm + LP | 0.95 | 1.11 | 1.2 | 2 | 0.02 |

As shown in the table, tmm+EP incurs significantly more structural hazards than base. This is primarily due to the back-pressure in the pipeline that resulted from pipeline stalls due to waiting for cache line flushes and store fences to complete. For Lazy Persistency, there are much fewer instances of structural hazards. Finally, the L2 cache miss rate is also higher with Eager Persistency due to cache line flushes.

Since Lazy Persistency allows caches to lazily evict blocks to NVMM as opposed to flushing them as in Eager Persistency, blocks may stay in the cache for a longer time. This higher cache residency time exposes a block to losing its value if a failure occurs, which will trigger recomputation on recovery. To measure such impact, volatility duration is defined as the period, in clock cycles, between the time a block becomes dirty in the LLC until it is evicted and written back to NVMM. The maximum value of volatility duration (maxvdur) attained by Lazy Persistency vs. EagerRecompute was measured. The maxvdur for EagerRecompute is 20% of the base system, indicating that eager flushing significantly shortens the volatility duration of cache blocks. In contrast, Lazy Persistency's maxvdur is 101% of base, because it relies on natural cache evictions, just like the base.

Maximum recovery time for Lazy Persistency may be arbitrarily large for a large cache, because the maximum volatility duration may increase with the cache size. To handle this issue, a simple hardware support is added that periodically cleans all dirty blocks in the caches. The cleanups are spaced in space (across cache sets) and in time, and happen in the background. Thus, the performance impact of periodic flushes is negligible. However, they incur write amplification, the degree of which depends on the frequency of flushes.

Figure 11:
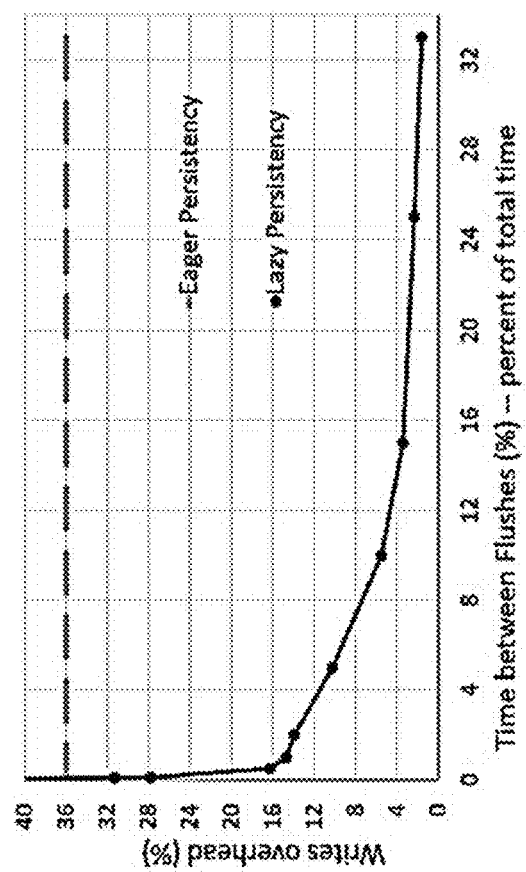
FIG. 11 is a graphical depiction of a comparison of the number of additional writes, as compared with a base line value, due to the time between data flushes, for Lazy Persistency and Eager Persistency.

FIG. 11 shows the relationship between the time between flushes and the number of writes to NVMM for Tiled Matrix Multiplication, normalized to the base case. As expected, the figure shows that increasing the time between flushes reduces the number of writes. The figure gives two additional insights. First, even with a tiny 0.08% time between flushes, the write overhead of 32% is still smaller than that of EagerRecompute (36%). Second, extending the time between flushes rapidly reduces write overheads to negligible amounts, for example less than 2% write overhead with 33% execution time between flushes.

Figure 12:
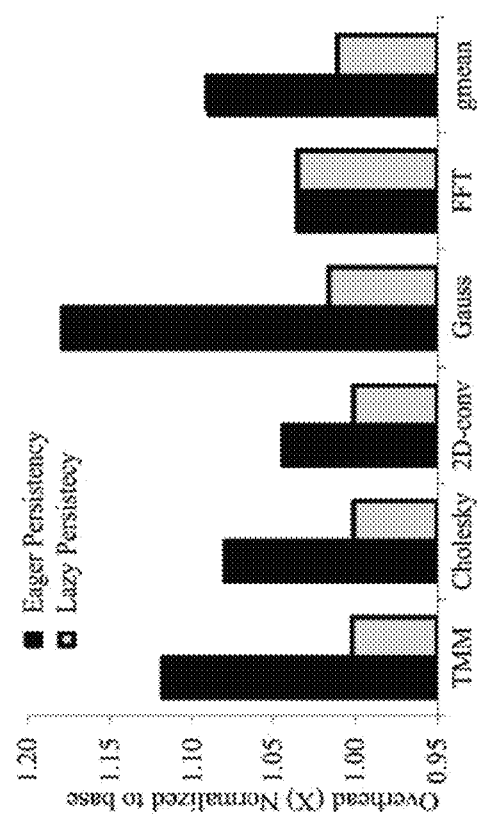
FIG. 12 is a graphical depiction of a comparison of execution time for Lazy Persistency and Eager Persistency.
Figure 13:
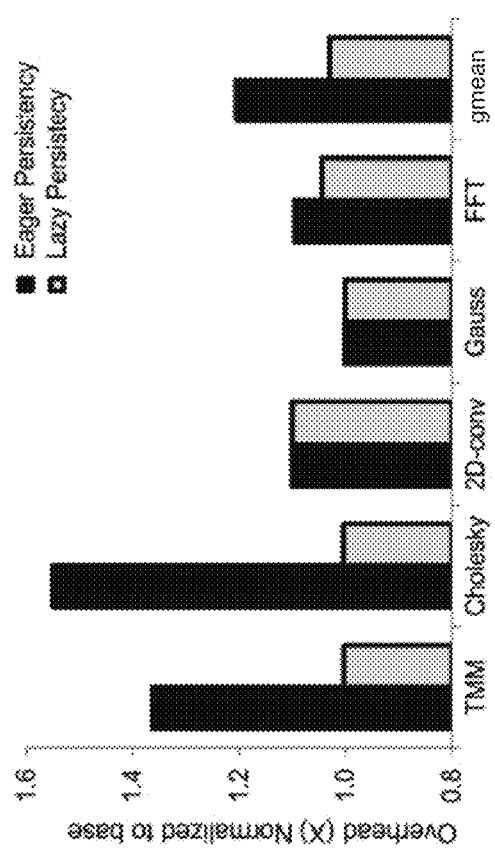
FIG. 13 is a graphical depiction of a comparison of write amplification overheads for Lazy Persistency and Eager Persistency.

In addition to tiled matrix multiplication, other benchmarks were run with EagerRecompute representing the state-of-the-art Eager Persistency, and compared with Lazy Persistency. FIGS. 12 and 13 show the execution time and write amplification overheads, respectively. All the numbers are normalized to unmodified versions of the benchmarks that are not failure safe.

FIG. 12 shows that Lazy Persistency incurs execution time overheads ranging from 0.1% to 3.5% (averaging 1.1%), compared to a range from 4.4% to 17.9% (averaging 9%) for EagerRecompute. Similarly, FIG. 13 shows that Lazy Persistency incurs write amplification overheads ranging from 0.1% to 4.4% (averaging 3%). On the other hand, EagerRecompute incurs write amplification overheads ranging from 0.2% to 55% (averaging 20.6%). Both figures show that Lazy Persistency achieves superior execution time overheads and write amplifications compared to Eager-Recompute.

Write amplification overheads differ from one workload to another significantly, due to several factors. One factor is the duration between writes to the same block. For a workload that stores frequently to the same block, either to the same byte or different bytes in a block, EagerRecompute forbids coalescing the stores in the cache, due to explicitly flushing a block repeatedly after each store. On the other hand, Lazy Persistency relies on natural cache eviction, allowing stores to coalesce in the cache. Hence, applications with high temporal and spatial store locality suffers a higher write amplification overhead with EagerRecompute. A second important factor is the total memory footprint of the workload. A workload with a relatively small memory footprint will make the extra writes caused by writing the checksums in Lazy Persistency become more significant (relative to the total number of writes), which shows up as a larger write amplification overhead. This factor also explains why the write amplification overheads of Lazy Persistency is 55% less than EagerRecompute in some workloads, but negligible in other workloads (e.g. Gauss). However, the overall trend shows that Lazy Persistency achieves about 17.6% less write amplification overheads than EagerRecompute.

The experiments shown in FIG. 12 were repeated on a real hardware system described in Table III. Table VII reports the execution time overhead for Lazy Persistency. Apart from small variations, the overall magnitude of the execution time overheads is consistent between the two experiments.

TABLE VII

Execution time overhead (%) for Lazy Persistency on a real system, normalized to the non-persistent base case.

| TMM | Cholesky | 2D-conv | Gauss | FFT | gmean |
|---|---|---|---|---|---|
| 0.8% | 1.1% | 0.9% | 2.1% | 1.1% | 1.1% |

Results differ due to varying the configuration parameters in order to measure the sensitivity to Lazy Persistency's performance. First, the NVMM read and write latencies were varied for both Lazy Persistency and EagerRecompute.

Figures 14A, 14B:
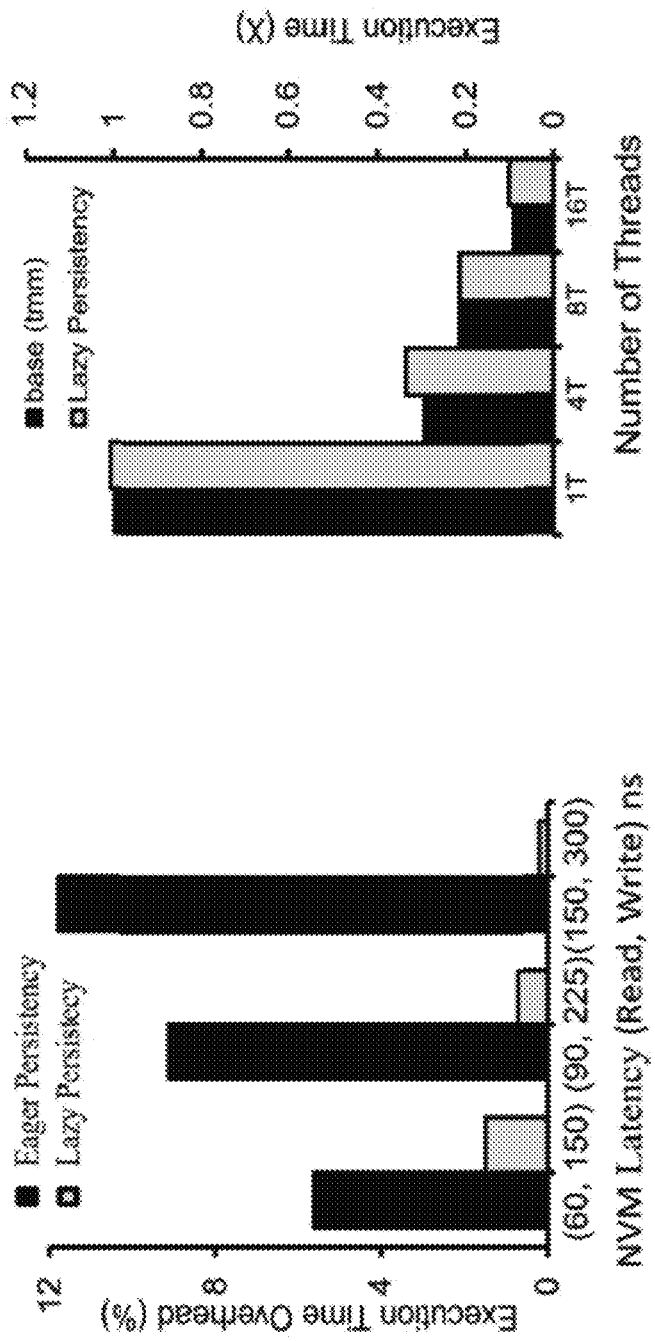
FIG. 14A is a graphical depiction of a comparison of the sensitivity of execution time overheads when non-volatile main memory latencies are varied, between Lazy Persistency and Eager Persistency.
FIG. 14B is a graphical depiction of a comparison of execution time when the number of threads varies from 1 to 16 between Lazy Persistency and a base line value.

FIG. 14A shows the results for three different sets of latencies expressed in the following format: (read latency, write latency), normalized to the base case for each respective set of latencies. As the latencies increase, execution time overheads trend differently for EagerRecompute vs. Lazy Persistency. With EagerRecompute, execution time trends higher because cache line flushes are more expensive, cache misses are also more expensive, and durable barriers also take longer time to complete. In contrast, with Lazy Persistency, the relative contribution of checksum computation on execution time decreases. FIG. 14B shows the execution time for Lazy Persistency and base (tmm) when the number of threads is varied from 1 to 16. All numbers are normalized to base running with 1 thread. As illustrated in the figure, Lazy Persistency achieves similar scalability with base (tmm) as the number of threads increases.

Figure 15B:
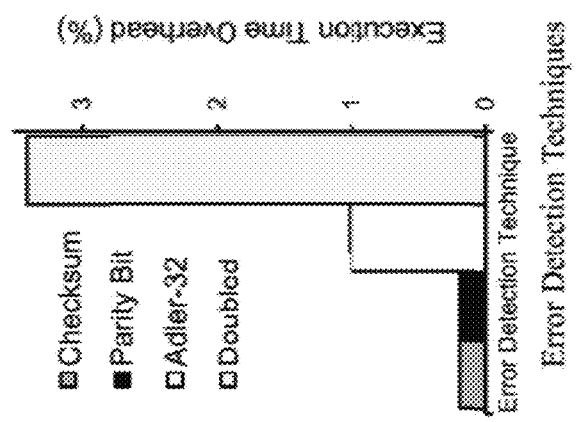
FIG. 15B is a graphical depiction of the sensitivity of execution time overheads when different effort detection techniques are used, showing that checksums and parity bits achieve the lowest overheads.
Figure 15A:
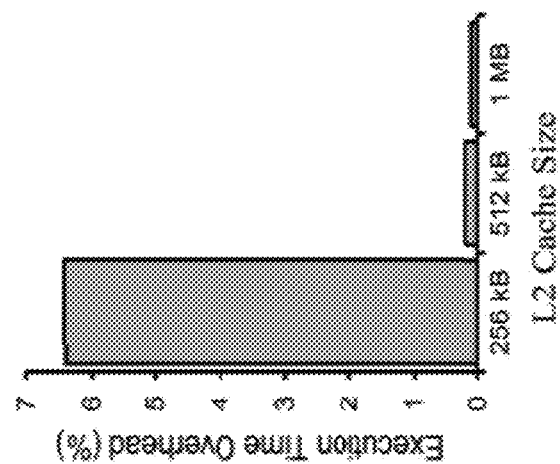
FIG. 15A is a graphical depiction of the sensitivity of execution time overheads when L2 cache size is varied, showing that an increase in cache size correlates with a decrease in Lazy Persistency overheads.

FIG. 15A shows the effect of L2 cache size on the execution time overhead over base (tmm). As the cache size increases, the overheads of Lazy Persistency decreases: a 256 KB L2 incurs an overhead of 6.5%, which decreases to 0.2% and 0.1% for a 512 KB and a 1 MB L2 cache, respectively. This is because for a small cache, the working set and the checksums overflow the cache, resulting in increased L2 miss ratios to above 4%, compared to only 2% and 1.5% with a 512 KB and a 1 MB L2 cache, respectively. The overhead difference between 512 KB and 1 MB is very small, indicating that the total working set and checksums fit in the L2 cache. In addition, Lazy Persistency is more effective with larger caches as more dirty blocks can stay in the cache longer. With a small cache, the effectiveness of Lazy Persistency is lower because dirty cache blocks will be evicted quickly due to limited capacity. FIG. 15B shows the execution time overheads from using different checksums over base (tmm). Modular checksums and parity bits achieve the lowest overheads, 0.2% and 0.1% respectively. Adler-32 incurs roughly 1% execution time overhead. A parallel combination of modular checksum and parity achieve lower a false negative rate but incurs a higher 3.4% execution time.

Conclusion

The proposed method, entitled Lazy Persistency herein, represents a novel software persistency technique that achieves data persistency while relying on normal cache eviction mechanisms. Lazy Persistency coding is free of cache flushes and persist barriers, which are both a part of existing eager persistency techniques. Instead, Lazy Persistency coding is split into associative regions that are protected by checksums that can be used to detect persistency failure, and recovery code that can restore the region upon a failure. Lazy Persistency was evaluated and compared to the state-of-the-art eager persistency technique of Eager-Recompute for several workloads. The results show the Lazy Persistency reduces the execution time and write amplification overheads, from 9%0 and 21%, to only 1% and 3%, respectively. Lazy Persistency opens the door for new hardware mechanisms that support persistency. A technique was evaluated for periodically flushing dirty data—while this modestly increases the number of writes, the technique introduces an upper bound on the recovery work needed after a failure.

Example 2

In another embodiment of the present invention, a Hybrid Recompute method is used to save data while not requiring persistency regions to be associative (a requirement of Lazy Persistency, described in detail above), as each region is guaranteed to be persisted before moving to the next region. Instead, the method persists a result matrix, the c matrix, in a non-atomic manner. Hence, while updating the c matrix, there is no guarantee of precisely consistent state. However, all updates to the matrix are durable and the system periodically waits for them to finish. If failure occurs before the updates to the c matrix are durable, it is possible that some elements of the c matrix are in an inconsistent state. However, because the induction variables in the loop nest are atomically updated, the exact region of the c matrix that may be inconsistent is known. If a failure occurs, the state is discarded, and the state's values are recomputed to restore the state of the matrix back to its status at the point of the failure. Thus, computation is faster and simpler, but at a cost of more complex and longer recovery.

FIG. 16A shows a tiled matrix multiplication code with the Recompute approach. In this code, a full ii iteration is computed before making all updated values durable (similar to the durable transaction example). In lines 13 to 17, all the c elements modified in the ii loop are made durable by flushing them to NVMM. The variable CLELEMENTS represents the number of matrix elements per cache line, and the variable ensures that only one clflushopt instruction is performed per cache line. Then, the lastPersistedII variable is updated to indicate which loop of ii is completed, so that the system continues from this loop after recovery (lines 18-20). Upon the completion of the sfence instruction in line 20, the modified elements of matrix c are guaranteed to be durable. Thus, with Recompute, the need for logging while updating the c elements and the lastPersistedII variable is eliminated. However, logging is still used for updating the indices (lines 22-35). From this technique, much overhead is removed from the normal execution path, but more burden is added on the recovery code to recompute all the previous parts of the elements of matrix c, from the beginning up until the point of the failure.

FIG. 16B shows the recovery code. The recovery starts by setting the indices for the range of c matrix cells that have to recomputed (lines 2 and 3). This range is determined from the lastPersistedII variable saved during normal program execution in FIG. 16A. After that, all the elements of matrix c that need to be recomputed are reset (or zeroed out) (lines 4-7). This reset step removes any intermediate values in these elements, and prevents any potential consistency problem. After that, the reset elements are recomputed from the beginning up until the kk loop iteration in which the failure occurs (lines 10-16). This kk loop iteration is determined from the lastPersistedKK variable saved during normal program execution in FIG. 16A, and allows the system to return to the state right before the crash happened. Finally, a loopnest of clflushopt instructions is used, followed by an sfence to make the recomputed values durable (lines 18-22).

Figure 17A:
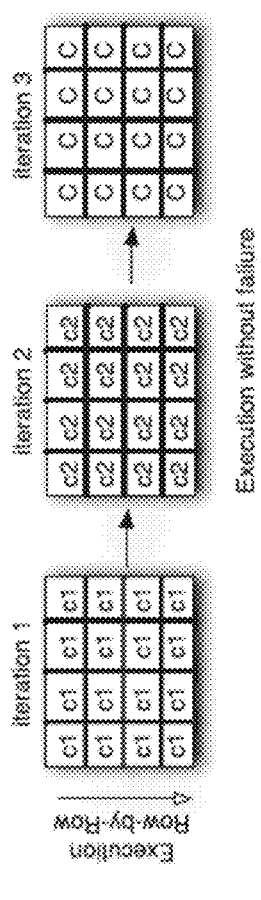
FIG. 17A is a depiction of a normal recompute execution without failure.
Figure 17B:
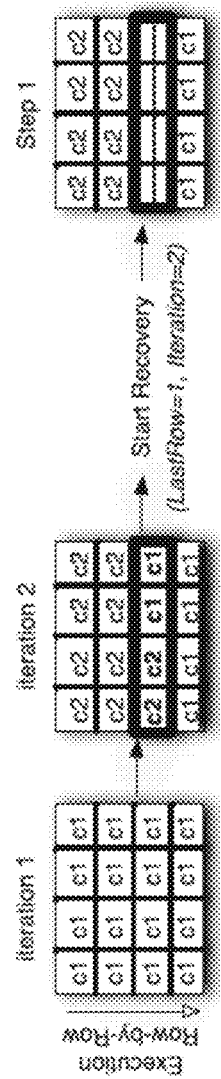
FIG. 17B is a depiction of a recompute execution with a failure during execution.
Figure 17C:
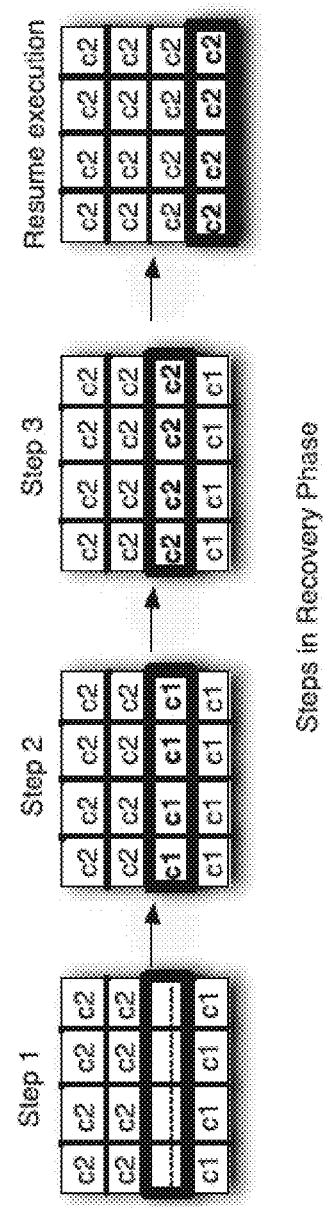
FIG. 17C is a depiction of a recovery phase after a failure during a recompute execution.

FIGS. 17A-C depict a simplified version of tiled matrix multiplication used to navigate through the steps of the Recompute scheme. FIGS. 17A-C illustrate the changes to the content of the result matrix. For simplicity, the changes to the matrix are assumed to happen at the granularity of a row as a persistency region. As shown in FIG. 17A, all the cells in the result matrix are updated at every outermost iteration (referred to as the kk loop in FIG. 16A). For any iteration i, calculating the value for any cell $c_i$ requires reading the input matrices (See FIG. 3) and the value of the same cell in the previous iteration ($c_i-1$). The only exception is for the first iteration, which requires only reading the values of the input matrices. In the case of failure-free execution, all the cells are updated at every iteration until reaching the final iteration (which is iteration 3 in the simplified example). At that point, the values in all the cells represent the final output of the kernel (illustrated with the uppercase C in FIG. 17A).

To facilitate recovery from a crash, normal execution with Recompute always keeps track of the achieved progress so that the system can locate the point from where the recovery should start, as illustrated in lines 18 and 29 in FIG. 16A. The example in FIG. 17B illustrates a case in which a failure occurs while computing the third row in iteration 2 (i.e., some of the cells in the row failed to persist c2). The recovery code starts the recovery process from the row following the variable LastRow and uses the variable Iteration to identify the iteration where the crash happened. Thus, the system can accurately identify the progress made before the crash.

With these details about the status before the crash, the recovery code of Recompute reconstructs the persistency region. The recovery steps are shown in FIG. 17C, which are consistent with the steps shown in the code in FIG. 16B. First, the content of the region following LastRow are zeroed out because the region may have inconsistent data due to the possibility of not fully persisting. The second step incrementally recomputes the content of the affected row from the first iteration until the last completed iteration (i.e., the one before the crashed iteration). Finally, the third step computes the content of the row corresponding to the crashed iteration and persists the content of the row. With that, the program returns to a consistent state and removed all the crash's side-effects, thereby concluding the recovery. From here on, the program can resume execution in the normal mode starting from the next row.

For the Recompute scheme to apply, an application or kernel requires the programmer to organize the application into persistency regions. These regions will be the atomic unit of recovery. The main requirement for this is that the recovery code must be able to reproduce the state of any persistency region and return the region to the state of the program right before entering the affected region (i.e., removing any partial results done within the affected region). One way to accomplish this is by choosing a persistency region such that it is idempotent. In such cases, the recovery code only needs to re-run the exact same region on recovery. Such idempotent regions simplify the recovery steps and make it (most likely) faster. However, such a scenario has limited applicability since many regions are not idempotent.

Fortunately, the Recompute scheme is applicable in cases where the persistency region is not idempotent, so long as there is a sequence of data dependencies starting from non-corrupted data (e.g., the workload's input), such that the persistency region can be reconstructed on recovery. This sequence of dependencies can go beyond the persistency region boundaries and does not require the region itself to be idempotent. For example, looking at the code shown in FIG. 16A, the ii loop chosen to be the persistency region is not idempotent. More specifically, due to the tiling optimization, the region reads the live-in value of c[i][j] (line 6), and then uses this value to generate the result that will be written to the same memory location c[i][j] (line 9) as a live-out of the region. Thus, having this Write-After-Read dependency in the same region defines the region as not being idempotent [29, 30]. Because of that, simply re-running the same code region when recovering after a crash might lead to incorrect results.

With the Recompute scheme, this code remains an eligible persistent region because the recovery code will be able to reproduce its computation by starting from the input matrices and re-calculating all of the iterations until the point where the crash happens (as shown in FIG. 16B). Accordingly, it is required that the original input to the algorithm not be modified during the execution. Otherwise, the starting point will not be available for re-generating the pre-crash state of the persistency region. Fortunately, many scientific applications are designed in a way that maintains this requirement. Another requirement is that the persistency region does not have data dependencies with other regions; this allows reconstructing each region independently after a crash. However, this excludes the data dependencies already included in the sequence of dependencies used for recovery.

Loop structures are not the only code structure that can satisfy these requirements. However, the loop structure makes it easier to track the program's progress using the loop's progress information (loop iterators, index, etc.), and thus, identifying the moment where the crash happened. In addition, the granularity of the persistency region can be varied by selecting different loops in a loop-nest, for example the inner-most loop or an outer-loop.

One limitation of the Recompute approach is the potential large amount of work that must be repeated for the elements of matrix c that were left in an inconsistent state, in the event that a crash occurs after running for a long time. This may result in a long recovery time. In the worst case, for a huge matrix, the recovery time may approach or even exceed the Mean Time To Failure (MTTF).

To avoid an overly lengthy recovery time, matrix c is periodically saved so that if a failure occurs, recomputing matrix elements can commence from the saved copy rather than starting over from the beginning. The recovery code only needs to re-execute from the iteration in which the copy was made until the point of failure. Furthermore, a copy of each element may be infrequently saved by spreading it over many iterations of the outermost loop nest, reducing the recovery time. For example, if 1/64 of the matrix is saved at every loop, the entire matrix c is fully copied every iteration of the algorithm. Similarly, the recovery code can be changed accordingly to determine how much recomputation is needed based on the iteration in which the last copy was taken.

While incurring less execution time and write overheads, Recompute requires a more complex code transformation and recovery compared to Checkpointing. Matrix multiplication and other applications are commonly used in HPC (and beyond) through a library. Thus, a library can implement the Recompute scheme efficiently, allowing end users to benefit from its performance without programming it on their own. Another approach for mitigating the implementation difficulty is through the addition of language or compiler support to help automate the process.

In the loop-based benchmarks evaluated, the same transformation steps for achieving failure safety using Recompute were observed. First, the programmer needs to provide the compiler with three hints: (1) the outermost loop of the persistence region (i.e., the kk loop in TMM); (2) the variables to be persisted (i.e., matrix c in TMM); and (3) the granularity of persistence (i.e., ii or jj in TMM). By specifying the outermost loop, the compiler infers which loop induction variables need to be logged. By specifying the name of all variables that must be persisted, the compiler can identify which stores must be made durable. By specifying the granularity of persistence, the compiler knows where to insert the cache line flushing instructions to make data durable. The compiler can also validate that all updates to the specified persistent variables are nested within the specified loop and that it can correctly generate a loop that flushes all modified elements to make them durable. These steps must be performed in a compiler pass after other loop transformations (e.g., tiling and unrolling) are considered.

FIG. 18A shows an example of a compiler directive for the recompute approach and its sample code. A pragma statement of directive "recompute" is placed just in front of the outermost loop, where logging code for induction variables will be inserted. The sentinel "NVM" indicates this directive is included in non-volatile memory API. The clause "persist" specifies variables and arrays with a range to be persisted and which loop performs it. For this example, the array c ranging from $c[ii][0]$ to $c[ii+bsize-1][n-1]$ is persisted at the end of every iteration of ii loop. According to the information provided by this directive, a compiler generates appropriate code in the recomputation approach manner.

FIG. 18B shows an example of the generated code for persisting the c matrix. Loop peeling is employed to adjust the beginning of the array to be persisted in the clflushopt loop. Thus, the generated code deals with the array even if the array is not aligned to a cache line. In the figure, line 5 is responsible for detecting the case where the result matrix is not aligned to a cache line. In this case, the first elements of the row, which do not start from the beginning of a cache line, are peeled off, and they will be flushed (line 11). The variable r1 indexes the first element of the row (line 10) that begins a new cache line. Otherwise, the variable r1 is initialized to 0 (line 8). For both cases, it will mark the beginning of the innermost loop that performs the flushes (line 14).

Similar to the Lazy Persistency method above, the Recompute method is evaluated on a simulator that is built on top of the gem5 simulator [19], using the x86-64 instruction set architecture (ISA). It models a detailed four-way out-of-order processor pipeline for each core, with parameters shown in Table VIII. The table also shows parameters for the two-level caches that we model, with private per-core L1 caches and an L2 cache shared by all cores. The memory hierarchy model is built on top of Ruby [20], with MESI protocol keeping the L1 caches coherent with respect to one another and with respect to the shared L2 cache. Beyond the L2 cache, the main memory is NVMM with 60 ns read latency and 150 ns write latency. However, if the latencies are higher, the relative benefits of the Recompute and Hybrid Recompute schemes will increase because they incur the fewest writes to the NVMM.

TABLE VIII

Baseline System Configuration

| Component | Configuration |
| --- | --- |
| Processor | OoO, 2 GHz, 4-wide issue/retire |
|  | ROB: 196, fetchQ/issueQ/LSQ: 48/48/48 |
| L1I and L1D | 64 KB, 8-way, 64B block, 2 cycles |
| L2 | 512 KB, 8-way, 64B block, 11 cycles |
| NVMM | Latencies: 60 ns read, 150 ns write |

Similar to the Lazy Persistency method above, the clflushopt instructions from INTEL® PMEM were implemented. Specifically, clflushopt is ordered only with respect to memory fences (including sfence and mfence) and with respect to older loads/stores to the same cache line address. Similar to stores, clflushopt accesses the cache after it is retired from the CPU pipeline. Moreover, clflushopt becomes durable and the instruction completes when the dirty cache block has been written back to the buffer in the memory module. The matrix is 1024×1024 in size, and the tile size is 16 in order to align them to the cache block size. Thus, to persist one stride, only one clflushopt is required.

In addition to the evaluation on the Gem5 simulator, we evaluated Naive Checkpointing and the Recompute scheme on a real system (shown in Table IX). As shown in the table, the machine used is DRAM-based (i.e., not NVMM-based) because NVMM-based systems are not commercially available yet. Thus, cache persistency instructions (e.g., CLFLUSHOPT, CLWB, etc.) were replaced with legacy CLFLUSH instructions. CLFLUSH has different ordering rules compared to CLFLUSHOPT; hence, the absolute performance results would be different than what our simulation experiments would report. However, since the instruction is applied consistently across all schemes, the instruction is useful for comparison.

TABLE IX

Real system used in evaluation

| Component | Configuration |
|---|---|
| Processor | 32 CPUs, AMD Opteron ™ Processor 6272, 2.1 GHz |
| L1I and L1D | 16 KB and 64 KB, respectively. 64B |
| L2 | 2 MB, 64B block |
| L3 | 6 MB, 64B block |
| Main Memory | 32 GB DRAM |

Table X shows multiple approaches applied to the tiled matrix multiplication that we evaluated. tmm is the baseline tiled matrix multiply with no persistence or checkpointing at all. tmm_CP is the Checkpointing approach. tmm+R, tmm+L, and tmm+HR are our Recompute, Logging, and Hybrid Recompute schemes, respectively. We evaluated two persistence granularities, namely ii loop granularity and j loop granularity, with the ii granularity being the default (e.g., in FIG. 16A). For most experiments, the matrix multiplication is run with eight worker threads plus one master thread. They run on nine cores.

TABLE X

Multiple Approaches Applied to the Tiled Matrix Multiplication to Achieve Write Durability of the Resultant Matrix

| Variant | Description |
|---|---|
| tmm | Tiled matrix multiplication |
| tmm + CP | Checkpointing (1 checkpoint) |
| tmm + R_ii | Recompute (ii granularity) |
| tmm + R_jj | Recompute (jj granularity) |
| tmm + L_ii | Transaction with Logging (ii granularity) |
| tmm + L_jj | Transaction with Logging (jj granularity) |
| tmm + HR_ii_x32 | Hybrid Recompute (ii granularity), checkpoint interval 32x of tmm + CP |
| tmm + HR_jj_x32 | Hybrid Recompute (jj granularity), checkpoint interval 32x of tmm + CP |
| tmm + HR_ii_x64 | Hybrid Recompute (ii granularity), checkpoint interval 64x of tmm + CP |
| tmm + HR_jj_x64 | Hybrid Recompute (jj granularity), checkpoint interval 64x of tmm + CP |

Other benchmarks that were evaluated include lower-upper decomposition (LU), Fast Fourier Transform (FFT), Gaussian elimination (Gauss), and two-dimensional convolution (2D-conv), as shown in Table XI.

TABLE XI

Summary of the benchmarks evaluated

| Benchmark | Description |
|---|---|
| TMM | 1k-square input tile matrix multiplication |
| LU | 1k-square input matrix LU decomposition |
| Cholesky | 1k-square input matrix Cholesky factorization |
| 2D-conv | 1k-square input matrix 2D convolution |
| Gauss | 4k-square input matrix Gauss elimination |
| FFT | 1-million nodes vector FFT |

In the simulation-based evaluation, all the schemes are simulated over the same number of loop iterations to ensure that each of the designs performs the same amount of work during the simulation window. The simulation window includes approximately 250 million instructions, on average, to warm up the caches and other structures, and an additional 300 million instructions are simulated and reported, on average.

For the real machine part, all the benchmarks run from the beginning to the end of the kernel, which is far longer than the simulation window used for the Gem5 simulation part. Overall, the number of instructions in the real machine experiments is about 40-60× higher than the number of instructions simulated in the Gem5 simulation part.

The execution time overhead of Checkpointing is evaluated and compared against Logging and the proposed Recompute and Hybrid Recompute schemes. The Checkpointing method was modeled optimistically by only counting the time to store all three matrices (a, b, and c) to NVMM, while ignoring the time to write to the file system, context switching, register file saving, and the precise interrupt. In addition, the time it takes to write the checkpoint to the NVMM was reduced in the Checkpointing model by using the x86-64 SSE (streaming single instruction, multiple data extensions) quadword store instruction, which is a SIMD (single instruction, multiple data) vector store.

Table XII shows the execution time and number of writes for all of the schemes studied, normalized to the base tiled matrix multiplication, which is not failure safe. The number of writes represents the number of L2 writebacks plus cache line flushes.

TABLE XII

Execution Time and Number of Write Comparison between Checkpointing (tmm + CP) and Different Granularity of Our Logging (tmm + L), Recompute (tmm + R), and Hybrid Recompute (tmm + HR) Schemes, Normalized to the Base Tiled Matrix Multiplication (tmm)

| Scheme | Execution Time | Number of Writes |
|---|---|---|
| base (tmm) | 1.00 | 1.00 |
| tmm + CP | 3.07 | 4.30 |
| tmm + L_ii | 1.08 | 2.11 |
| tmm + L_jj | 1.09 | 2.23 |
| tmm + R_ii | 1.05 | 1.07 |
| tmm + R_jj | 1.06 | 1.15 |
| tmm + HR_ii_x32 | 1.08 | 1.13 |
| tmm + HR_jj_x32 | 1.07 | 1.08 |
| tmm + HR_ii_x64 | 1.09 | 1.20 |
| tmm + HR_jj_x64 | 1.08 | 1.16 |

As can be seen in the table, Checkpointing (tmm+CP) more than triples the execution time (3.07×) and quadruples NVMM writes (4.3×). This is because a snapshot of the matrices are copied to another memory location in the NVMM. The number of writes Checkpointing incurs is troublesome since NVMM often has limited write endurance. Logging (tmm+L) incurs acceptable small execution time overheads: 8% and 9% for the ii and jj granularities, respectively. However, Logging causes a significant increase in the number of writes: 2.11×& 2.23× for the ii and jj granularities, respectively. Although lower than those in Checkpointing, the number of writes overheads are still problematic for NVMM write endurance. Note that the ii granularity yields lower execution time and write overheads compared to the jj granularity. This is expected as the ii loop envelopes the inner jj loop. Recompute simultaneously achieves low execution time overheads (5% and 6% for the ii and jj granularities, respectively) and low write overheads (7% and 15% for ii and jj granularities, respectively). This shows that for loop-based code, it is possible to achieve failure safety without incurring much execution time or write overheads.

Finally, the Hybrid Recompute scheme was evaluated with 32× and 64× of the checkpoint interval of tmm+CP (both denoted by the tmm+HR prefix). As expected, less frequent checkpointing reduces both execution and write overheads: 7% with tmm+HR_ii_×64 vs. 8% for tmm+HR_ii_×32. The same observation applies for the jj granularity as well. Compared to Recompute, Hybrid Recompute with 64× checkpointing interval incurs 1-2% slightly higher execution time and write overheads. However, the recompute effort during failure recovery is much lower, and is bounded by 64 iterations. Compared to Checkpointing, the overhead is much lower since only a small part of matrix c is copied at each iteration.

The high execution time and number of writes overheads for Checkpointing are closely related to the frequency of taking checkpoints. On a system that takes frequent checkpoints, execution time and write overheads are higher than on a system that takes checkpoints less frequently. In contrast to Checkpointing, the overheads of Logging, Recompute, and Hybrid Recompute are constant (i.e., this overhead is incurred with every loop iteration). Accordingly, the Checkpointing and Hybrid Recompute methods are compared to determine if the frequency of taking checkpoints be reduced such that the execution time overhead for Checkpointing is equal to or lower than Hybrid Recompute.

Figure 19:
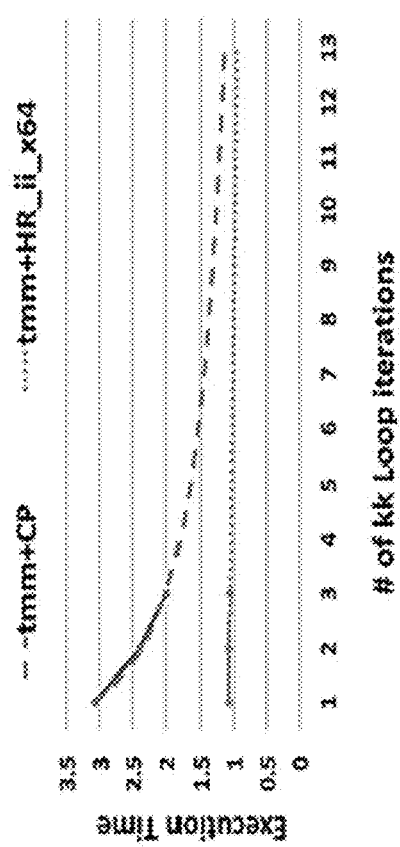
FIG. 19 is a graphical depiction of a comparison of loop iterations for a prior art Checkpointing system (tmm+CP) and the proposed Hybrid Recompute system with a matrix-saving frequency of 64×(tmm+HR_ii_×64).

The execution time of Checkpointing is plotted normalized to Hybrid Recompute at ii granularity at 64× the checkpointing frequency, as we vary the number of kk loop iterations, as shown in FIG. 19. The execution time speedup ratio of Checkpointing decreases inversely proportionally as the number of kk loop iteration increases, as the checkpoint creation overhead is amortized across more iterations, whereas the ratio remains constant for tmm+HR. There is a loop iteration count N such that checkpointing may become cheaper than Recompute, and N is likely quite high. Repeating the same methodology for the number of writes, the parity point between the write overhead of Checkpointing and Hybrid Recompute occurs at 155 kk loop iterations, which is significantly higher than the ratio observed for the execution time overhead.

Tables XIII and XIV show the execution time and number of writes overhead, respectively, for running the different schemes with different number of threads (thread count). These overheads are normalized to the base tiled matrix multiplication (tmm) running with the respective thread count. each scheme's sensitivity to thread count was evaluated for 1, 4, 8, and 12 threads, while adjusting the number of cores to scale with the thread count. All runs in Tables XIII and XIV are for the same amount of work (i.e., running the same number of iterations of the tiled matrix multiplication).

TABLE XIII

Normalized Execution Time as the Thread Count Varies from 1 to 12 Threads, for Various Schemes

| Scheme | 1T | 4T | 8T | 12T |
|---|---|---|---|---|
| base (tmm) | 1.00 | 1.00 | 1.00 | 1.00 |
| tmm + CP | 1.88 | 2.85 | 3.07 | 3.27 |
| tmm + L_ii | 1.30 | 1.25 | 1.08 | 1.08 |
| tmm + L_jj | 1.36 | 1.26 | 1.09 | 1.10 |
| tmm + R_ii | 1.15 | 1.12 | 1.05 | 1.04 |
| tmm + R_jj | 1.18 | 1.14 | 1.06 | 1.05 |
| tmm + HR_ii_x32 | 1.21 | 1.17 | 1.08 | 1.07 |
| tmm + HR_jj_x32 | 1.21 | 1.16 | 1.07 | 1.06 |
| tmm + HR_ii_x64 | 1.26 | 1.17 | 1.09 | 1.07 |
| tmm + HR_jj_x64 | 1.26 | 1.16 | 1.08 | 106 |

TABLE XIV

Normalized Number of NVMM Writes as the Thread Count Varies from 1 to 12 Threads, for Various Schemes

| Scheme | 1T | 4T | 8T | 12T |
|---|---|---|---|---|
| base (tmm) | 1.00 | 1.00 | 1.00 | 1.00 |
| tmm + CP | 4.10 | 4.09 | 4.03 | 3.65 |
| tmm + L_ii | 2.12 | 2.05 | 2.04 | 1.17 |
| tmm + L_jj | 2.04 | 2.12 | 2.23 | 1.43 |
| tmm + R_ii | 1.03 | 1.03 | 1.07 | 1.02 |
| tmm + R_jj | 1.03 | 1.10 | 1.15 | 1.09 |
| tmm + HR_ii_x32 | 1.09 | 1.09 | 1.13 | 1.06 |
| tmm + HR_jj_x32 | 1.04 | 1.05 | 1.08 | 1.04 |
| tmm + HR_ii_x64 | 1.09 | 1.17 | 1.21 | 1.19 |
| tmm + HR_jj_x64 | 1.05 | 1.12 | 1.16 | 1.12 |

Table XIII shows that Checkpointing (tmm+CP) incurs higher execution time as thread count increases. This is mainly because it requires all threads to synchronize before it can take the checkpoint. While the base execution time decreases as thread count increases due to increasing parallelism, the checkpoint creation time remains the same, and the synchronization time increases slightly. Thus, relative to the base execution time, the overhead from checkpoint creation increases. The execution time overheads for Logging (tmm+L), Recompute (tmm+R), and Hybrid Recompute (tmm+HR) slightly decrease as the number of threads increases. This is true for both ii and jj granularities. Comparing across schemes, Recompute holds on to its execution time overhead advantage compared to other schemes. For 12 threads, its execution time overhead is only 4%, vs. 8% for Logging and 6% for the Hybrid Recompute. All other previous observations remain, i.e., the ii granularity produces less overheads vs. the jj granularity, and 64× Hybrid Recompute incurs less overheads compared to its 32× counterpart. Regarding the write overheads, Table XIV does not show any strong trend affected by the thread count.

Figures 20A, 20B:
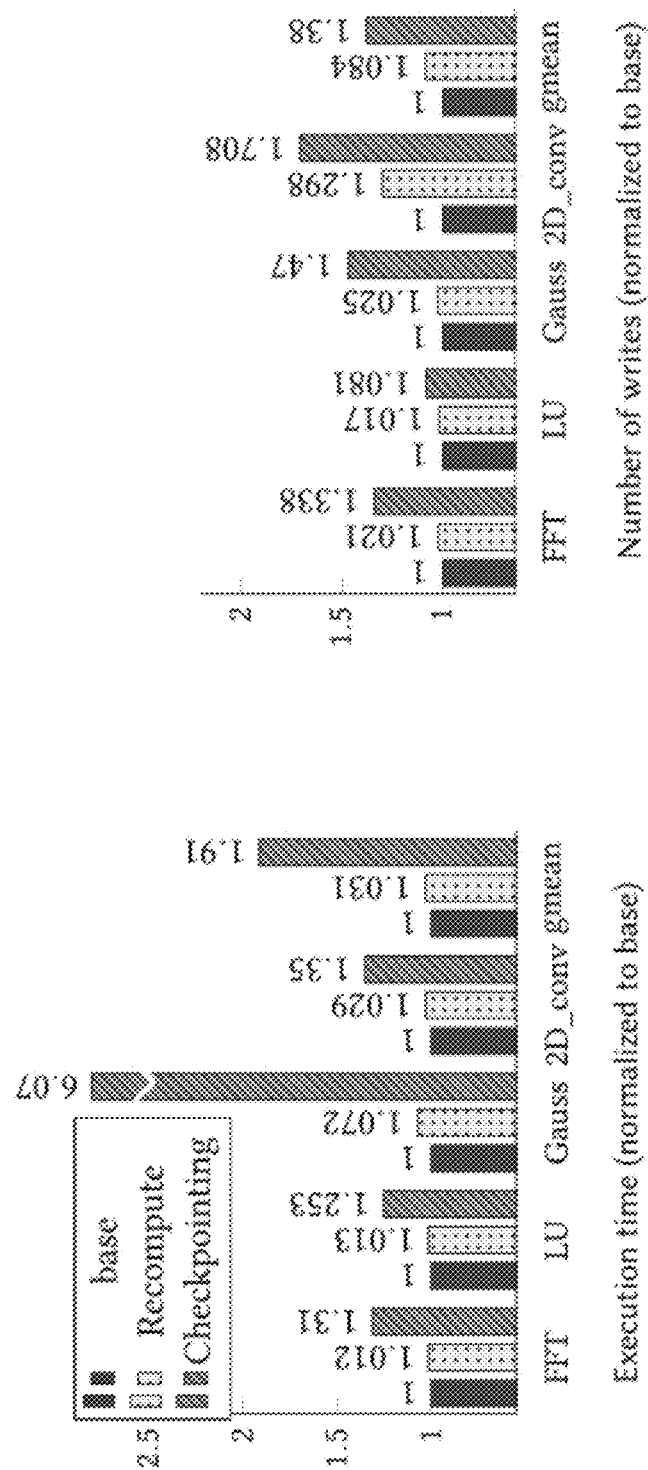
FIG. 20A is a graphical depiction of a comparison of execution time between the prior art Checkpointing system and the proposed Recompute system for various benchmarks.
FIG. 20B is a graphical depiction of a comparison of the number of writes between the prior art Checkpointing system and the proposed Recompute system for various benchmarks.
Figure 21C:
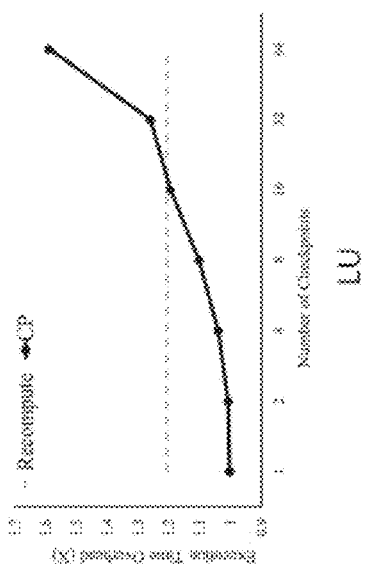
FIG. 21C is a graphical depiction of a comparison of the prior art Checkpointing system and the proposed Recompute system, specifically comparing execution time overheads as a function of the number of checkpoints for a lower-upper decomposition (LU) benchmark.
Figure 21B:
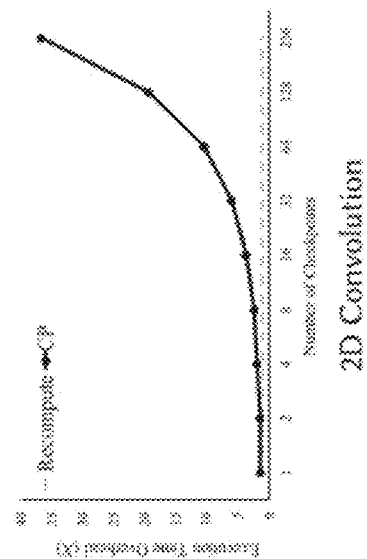
FIG. 21B is a graphical depiction of a comparison of the prior art Checkpointing system and the proposed Recompute system, specifically comparing execution time overheads as a function of the number of checkpoints for a two-dimensional convolution benchmark.
Figure 21A:
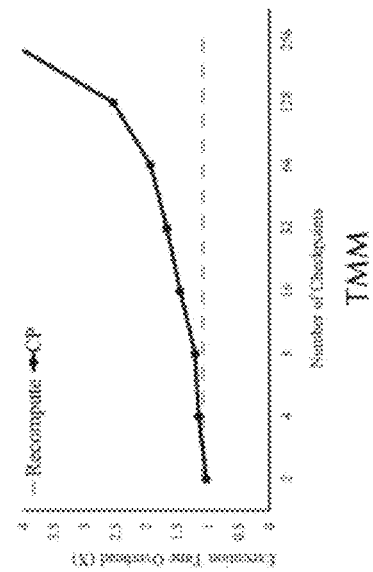
FIG. 21A is a graphical depiction of a comparison of the prior art Checkpointing system and the proposed Recompute system, specifically comparing execution time overheads as a function of the number of checkpoints for a baseline tiled matrix multiplication benchmark.
Figure 21F:
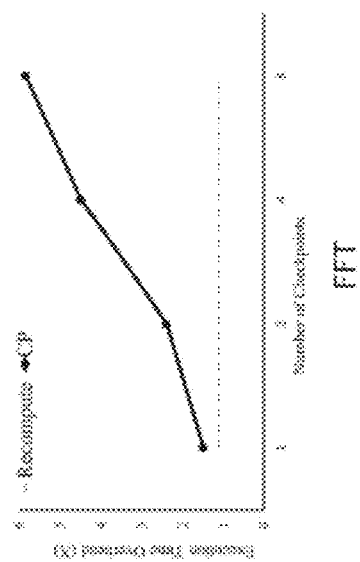
FIG. 21F is a graphical depiction of a comparison of the prior art Checkpointing system and the proposed Recompute system, specifically comparing execution time overheads as a function of the number of checkpoints for a Fast Fourier Transform (FFT) benchmark.
Figure 21E:
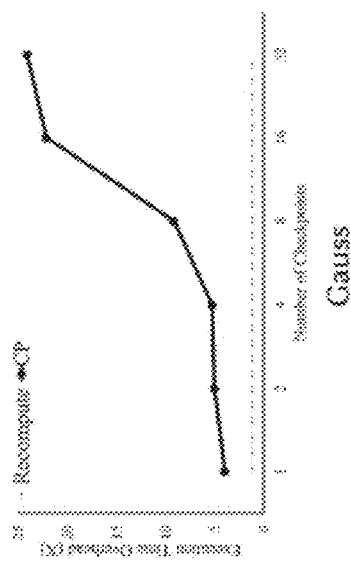
FIG. 21E is a graphical depiction of a comparison of the prior art Checkpointing system and the proposed Recompute system, specifically comparing execution time overheads as a function of the number of checkpoints for a Gaussian (Gauss) elimination benchmark.
Figure 21D:
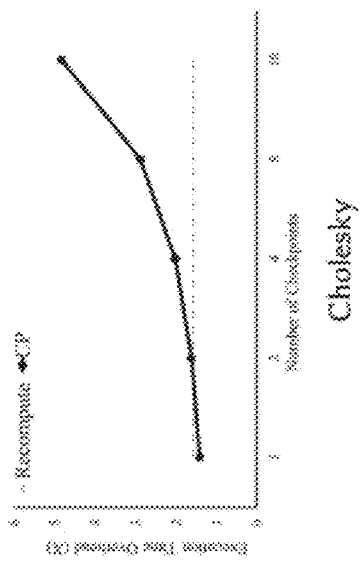
FIG. 21D is a graphical depiction of a comparison of the prior art Checkpointing system and the proposed Recompute system, specifically comparing execution time overheads as a function of the number of checkpoints for a Cholesky benchmark.
Figure 22C:
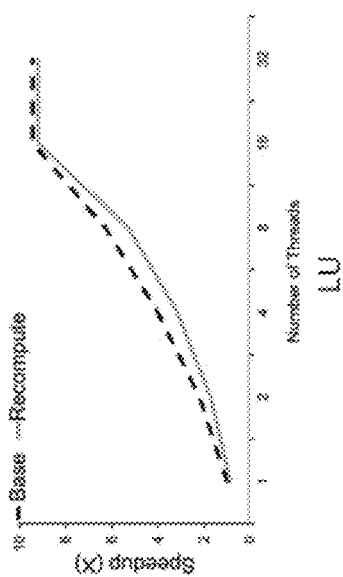
FIG. 22C is a graphical depiction of a comparison of a non-failure base system and the proposed Recompute system, specifically comparing the impact of the number of parallel threads on a speedup for a lower-upper decomposition (LU) benchmark.
Figure 22B:
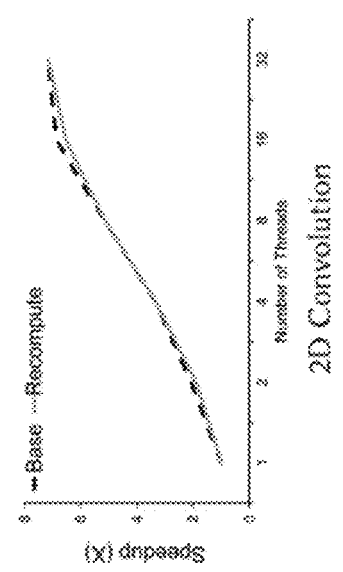
FIG. 22B is a graphical depiction of a comparison of a non-failure base system and the proposed Recompute system, specifically comparing the impact of the number of parallel threads on a speedup for a two-dimensional convolution benchmark.
Figure 22A:
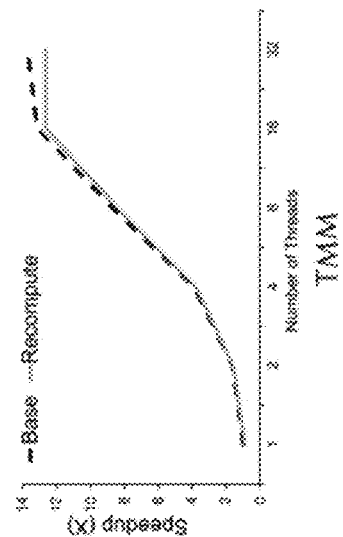
FIG. 22A is a graphical depiction of a comparison of a non-failure base system and the proposed Recompute system, specifically comparing the impact of the number of parallel threads on a speedup for a baseline tiled matrix multiplication benchmark.
Figure 22F:
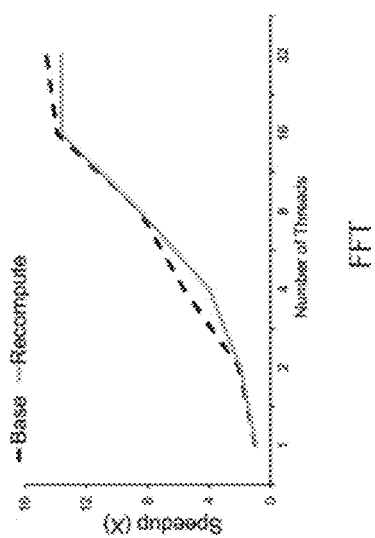
FIG. 22F is a graphical depiction of a comparison of a non-failure base system and the proposed Recompute system, specifically comparing the impact of the number of parallel threads on a speedup for a Fast Fourier Transform (FFT) benchmark.
Figure 22E:
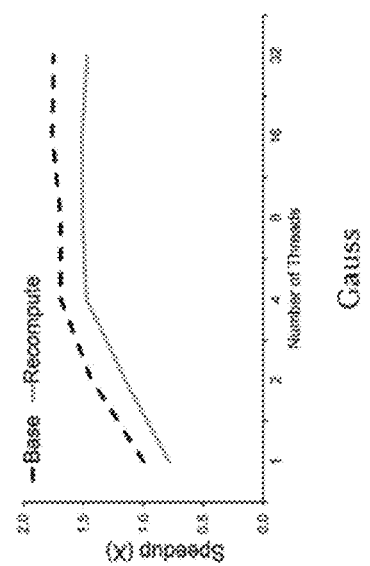
FIG. 22E is a graphical depiction of a comparison of a non-failure base system and the proposed Recompute system, specifically comparing the impact of the number of parallel threads on a speedup for a Gaussian (Gauss) elimination benchmark.
Figure 22D:
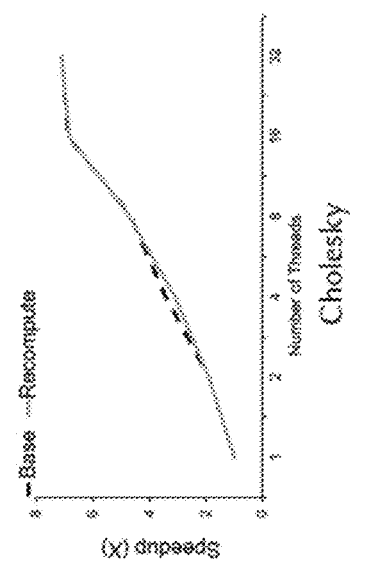
FIG. 22D is a graphical depiction of a comparison of a non-failure base system and the proposed Recompute system, specifically comparing the impact of the number of parallel threads on a speedup for a Cholesky benchmark.

Similar results are demonstrated on the other workloads studied. FIGS. 20A-B show the normalized execution time and number of writes for four other benchmarks and their geometric means, with each benchmark running with eight threads. FIG. 20A shows Recompute incurring execution time overheads between 1-7% (averaging 3%), compared to a range of 31-507% (averaging 91%) for Checkpointing. FIG. 20B shows Recompute incurring NVMM write overheads between 2-30% (averaging 8%), compared to a range of 8-71% (averaging 38%) for Checkpointing. The benefit from Recompute differs from one benchmark to another, depending on the nature of the benchmark. For Gauss, the savings in execution time from Recompute is significantly higher than the savings in the number of writes. The reason for this is that Gauss has decreasing computation effort per iteration as the program runs. This makes the execution time overhead of Checkpointing higher compared to Recompute.

In addition to the simulation-based evaluation, the methods were evaluated on a real machine with configuration shown in Table IX. Using a real machine allows the benchmarks to be run from the beginning to the end, which is a far longer execution window compared to what is feasible with simulation evaluation. Investigating application behavior from start to completion made it possible to get clearer insights. On top of that, if the results from real machine evaluation are consistent with the results from the simulator, the simulation evaluation is validated.

As discussed above, the comparison of the overheads of Naive Checkpointing and Recompute Scheme is crucial for deciding which scheme is better for a specific situation. This decision can be made by finding the checkpoint frequency where the overheads for the two schemes intersect. If the checkpointing frequency is higher than the intersection point, Recompute is cheaper than checkpointing. On the other hand, if the checkpointing frequency is lower than the intersection point, the traditional Checkpointing is cheaper than Recompute.

FIGS. 21A-F show the execution time overheads of Recompute versus Checkpointing, the latter plotted as a function of checkpointing frequency that varies from 1 to 256 checkpoints for the entire run of each application. Such results are not feasible to obtain using simulations because that would take too much time, as described above. In contrast, running on a real machine allows the results to be collected due to our ability to run applications from start to completion. Note that these curves rely on DRAM-based memory; it is expected that the execution time overheads will be higher for checkpointing on actual NVMM-based systems due to the limited write bandwidth available in such systems. Thus, the overhead difference between checkpointing and Recompute is underestimated on DRAM-based systems because Recompute requires much lower write bandwidth than checkpointing.

As expected, FIGS. 21A-F show that increasing the checkpointing frequency causes an increase in the execution time overheads of checkpointing due to the time spent in creating the checkpoints. The execution overheads of Recompute do not depend on checkpointing frequency as no checkpoint is created.

FIGS. 21A-F show that the impact of changing the checkpointing frequency on the execution time overhead is not identical across the benchmarks. Some benchmarks are very sensitive to checkpointing frequency; even creating one checkpoint incurs higher execution time overheads than Recompute (e.g., FFT and Gauss). At the other extreme, one benchmark (LU) does not incur much execution time overheads from checkpointing; only when 16 checkpoints are created does the execution time overhead from checkpointing exceed that of Recompute. All the remaining benchmarks (e.g., TMM, 2D Convolution, and Cholesky) show execution time overheads of checkpointing that are slightly lower if very few checkpoints are created, but show significantly higher overheads as the checkpointing frequency increases.

Several factors contribute to how Recompute compares vs. Checkpointing as Checkpointing frequency changes. First, the time it takes to create a checkpoint is determined by the amount of data that needs to be checkpointed. In a benchmark with a high memory footprint, creating a checkpoint takes a long time; hence, such a benchmark is more sensitive to the increase in checkpointing frequency. Second, how well Recompute does compared to the base matters. Even if the time for creating a checkpoint is relatively modest, it is difficult for Naive Checkpointing to compete with Recompute if the latter incurs negligible overheads compared to the base (e.g., 2D-Convolution). On the other hand, when Recompute suffers from high overheads compared to the base, Naive Checkpointing can enjoy higher checkpointing frequency without making it more expensive than Recompute (e.g. LU). Table XV summarizes the benchmarks studied and categorizes each benchmark based on the intersection point between Recompute and Naive Checkpointing.

TABLE XV

Summary of the studied benchmarks

| When Is Checkpointing Overhead Higher | Benchmarks |
| --- | --- |
| Always | FFT |
| | 2D-Convolution |
| | Gauss |
| After a small number of checkpoints | TMM (3 checkpoints) |
| | Cholesky (2 checkpoints) |
| After a large number of checkpoints | LU (16 checkpoints) |

CONCLUSION

The decision of which scheme to use is not a straightforward one; it requires analysis of the benchmarks and the minimum number of checkpoints based on the MTTF of the studied system. However, as shown in FIGS. 21A-F, Recompute outperforms Naive Checkpointing in most of the studied benchmarks. Furthermore, for half of these benchmarks (the first category in Table XV), Recompute is a better choice regardless of the checkpointing frequency. For these benchmarks, the decision is relatively easy to arrive at because creating even one check-point will be more expensive than the execution time overheads with Recompute.

FIGS. 22A-F illustrate the speedup comparison for all the studied benchmarks when the number of threads varies from 1 to 32. As can be seen in the figures, Recompute scales almost as effectively as base for all the benchmarks. This confirms the observation from the simulation evaluation described above for TMM. Furthermore, the figures confirm that Recompute is just as effective and scalable in other benchmarks as well.

The Gauss benchmark (shown in FIG. 22E) is one of the benchmarks that does not show good scaling with an increasing number of threads. This is because it has a decreasing amount of computation per iteration as the program progresses, causing significant load imbalance between threads. This behavior is observed only as the evaluation covers the final stages of the workload where the amount of computation becomes very small, which couldn't be reached without the real-hardware evaluation.

The proposed Recompute and Hybrid Recompute approaches are based on the novel observation that an inconsistent state can be tolerated to gain performance and reduce the number of writes to NVMM for loop-based code. Rather than logging all of the state modified during a transaction, which incurs large overheads, only enough state is logged to enable recomputation. The recompute-based approach is optimized to avoid recomputing from the beginning, with little additional overhead. As shown in the results above, the Recompute methods simultaneously achieves good execution time performance and does not adversely affect NVMM write endurance.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program PIN embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program PIN embodied on a computer readable medium may be transmitted using any appropriate medium, including but not limited to wireless, wire-line, optical fiber cable, radio frequency, etc., or any suitable combination of the foregoing. Computer program PIN for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

REFERENCES

[1] B. Schroeder and G. A. Gibson, "Understanding Failures in Petascale Computers," Journal of Physics, 2007.
[2] D. Ibtesham, K. B. Ferreira, and D. Arnold. "A Checkpoint Compression Study for High-performance Computing Systems," International Journal of High Performance Computer Applications, 2015.
[3] S. Kannan, A. Gavrilovska, K. Schwan, and D. Milojicic, "Optimizing Checkpoints Using NVM as Virtual Memory," in Proceedings of the International Parallel and Distributed Processing Symposium (IPDPS), 2013.
[4] X. Dong, N. Muralimanohar, N. Jouppi, R. Kaufmann, and Y. Xie, "Leveraging 3D PCRAM Technologies to Reduce Checkpoint Overhead for Future Exascale Systems," in Proceedings of the International Conference on High Performance Computing Networking, Storage and Analysis (SC), 2009.
[5] A. Moody, G. Bronevetsky, K. Mohror, and B. R. d. Supinski, "Design, Modeling, and Evaluation of a Scalable Multi-level Checkpointing System," in Proceedings of the International Conference on High Performance Computing, Networking, Storage and Analysis (SC), 2010.
[6] G. Bronevetsky, D. Marques, K. Pingali, P. K. Szwed, and M. Schulz, "Application-level Checkpointing for Shared Memory Programs," in Proceedings of the International Conference on Architectural Support for Programming Languages and Operating Systems (ASPLOS), 2004.
[7] Intel and Micron, "Intel and micron produce breakthrough memory technology," 2015.
[8] R. Rajachandrasekar, S. Potluri, A. Venkatesh, K. Hamidouche, M. W. ur Rahman, and D. K. D. Panda, "MIC-Check: A Distributed Checkpointing Framework for the Intel Many Integrated Cores Architecture," in Proceedings of the International Symposium on High-performance Parallel and Distributed Computing (HPDC), 2014.

[9] B. C. Lee, "Phase Change Technology and The Future of Main Memory," IEEE Micro, 2010.

[10] T. Kawahara, R. Takemura, K. Miura, J. Hayakawa, S. Ikeda, Y. Lee, R. Sasaki, Y. Goto, K. Ito, T. Meguro, F. Matsukura, H. Takahashi, H. Matsuoka, and H. Ohno, "2 Mb Spin-Transfer Torque RAM (SPRAM) with Bit-by-Bit Bidirectional Current Write and Parallelizing-Direction Current Read," in Proceedings of the International Solid-State Circuits Conference (ISSCC), 2007.

[11] E. Kultursay, M. Kandemir, A. Sivasubramaniam, and O. Mutlu, "Evaluating STT-RAM as an Energy-efficient Main Memory Alternative," in Proceedings of the International Symposium on Performance Analysis of Systems and Software (ISPASS), 2013.

[12] H. Akinaga and H. Shima, "Resistive Random Access Memory (ReRAM) Based on Metal Oxides," IEEE Journal, 2010.

[13] A. Awad, Y. Wang, D. Shands, and Y. Solihin, "Obfus-Mem: A Low-Overhead Access Obfuscation for Trusted Memories," in Proceedings of the International Symposium on Computer Architecture (ISCA), 2017.

[14] A. Awad, B. Kettering, and Y. Solihin, "Non-volatile Memory Host Controller Interface Performance Analysis in Highperformance I/O Systems," in Proceedings of International Symposium on Performance Analysis of Systems and Software (ISPASS), 2015.

[15] A. Awad, P. Manadhata, S. Haber, Y. Solihin, and W. Home, "Silent Shredder: Zero-Cost Shredding for Secure Non-Volatile Main Memory Controllers," in Proceedings of the International Conference on Architectural Support for Programming Languages and Operating Systems (ASPLOS), 2016.

[16] A. Awad, S. Blagodurov, and Y. Solihin, "Write-Aware Management of NVM-based Memory Extensions," in Proceedings of the International Conference on Supercomputing (ICS), 2016.

[17] S. A. Mahlke, W. Y. Chen, W.-m. W. Hwu, B. R. Rau, and M. S. Schlansker, "Sentinel scheduling for vliw and superscalar processors," in Proceedings of the Fifth International Conference on Architectural Support for Programming Languages and Operating Systems, ser. ASPLOS V, 1992.

[18] M. A. de Kruijf, K. Sankaralingam, and S. Jha, "Static analysis and compiler design for idempotent processing," in Proceedings of the 33rd ACM SIGPLAN Conference on Programming Language Design and Implementation, 2012.

[19] N. Binkert and et al., "The GEM5 simulator," ACM SIGARCH Computer Architecture News (CAN), 2011.

[20] "Ruby memory system," 2016, http://gem5.org/Ruby.

[21] I. Corp., "Intel 64 and IA-32 Architectures Developer's Manual: Vol. 3A," 2016.

[22] K. Osawa, A. Sekiya, H. Naganuma, and R. Yokota, "Accelerating matrix multiplication in deep learning by using low-rank approximation," in 2017 International Conference on High Performance Computing Simulation (HPCS), 2017.

[23] Y. Jia, "Learning semantic image representations at a large scale," Ph.D. dissertation, 2014.

[24] M. E. Wolf and M. S. Lam, "A Data Locality Optimizing Algorithm," in Proceedings of the International Conference on Programming Language Design and Implementation (PLDI), 1990.

[25] H. Elnawawy, M. Alshboul, J. Tuck, and Y. Solihin, "Efficient Checkpointing of Loop-Based Codes for Non-Volatile Main Memory," in Proceedings of the 26th International Conference on Parallel Architectures and Compilation Techniques (PACT), 2017.

[26] S. C. Woo, M. Ohara, E. Torrie, J. P. Singh, and A. Gupta, "The SPLASH-2 Programs: Characterization and Methodological Considerations," in Proceedings of International Symposium on Computer Architecture (ISCA), 1995.

[27] S. C. Woo, J. P. Singh, and J. L. Hennessy, "The Performance Advantages of Integrating Block Data Transfer in Cache-Coherent Multiprocessors," in Proceedings of the International Conference on Architectural Support for Programming Languages and Operating Systems (ASPLOS), 1994.

[28] S. Ahn, "Convolution," 2005, http://www.songho.ca/dsp/convolution/convolution.html.

[29] M. A. de Kruijf and K. Sankaralingam, "Idempotent processor architecture," in Proceedings of the 44th Annual IEEE/ACM International Symposium on Microarchitecture (MICRO-44). 2011.

[30] Q. Liu, J. Izraelevitz, S. K. Lee, M. L. Scott, S. H. Noh, and C. Jung. "iDO: Computer-directed failure atomicity for nonvolatile memory," in 2018 51st Annual IEEE/ACM International Symposium on Microarchitecture (MICRO). 2018.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of improving crash recovery, the method comprising the steps of:

providing a set of instructions organized into a plurality of regions, at least one of the plurality of regions being a recovery unit and including written data to be transferred to a non-volatile main memory, and at least another of the plurality of regions being an error checking unit adapted to summarize the written data in the recovery unit;

reading the written data from the recovery unit and calculating a first value via the error checking unit, the first value including a baseline value of the written data;

transferring at least a portion of the written data from the recovery unit to the non-volatile main memory via natural cache evictions, such that the at least a portion of the written data is transferred in the background and not actively pushed to the non-volatile main memory, thereby reducing computing costs associated with the data transfer;

reading the at least a portion of the written data from the non-volatile main memory and calculating a second value via the error checking unit, the second value including a value of the written data transferred from the recovery unit to the non-volatile main memory;

comparing the second value with the first value, wherein a determination that the values do not match indicates a failure occurred, necessitating system recovery; and executing a recovery code to perform the system recovery based on the determination that the values do not match, the recovery code adapted to read through the plurality of regions in reverse order to determine when the failure occurred by comparing the written data from the non-volatile main memory with the written data from the recovery unit, such that the system does not require a step of logging data to create a checkpoint.

2. The method of claim 1, wherein each of the plurality of regions is associated with the other regions.

3. The method of claim 2, wherein the plurality of regions is transferred to the non-volatile main memory out of order based on an order of the transfer of written data to the non-volatile main memory.

4. The method of claim 2, further comprising the step of identifying a failure point within the plurality of regions during the step of executing the recovery code.

5. The method of claim 4, further comprising the steps of resetting any values associated with the written data after the failure point, and recalculating the reset values associated with the written data until the first value matches the second value.

6. The method of claim 1, wherein the plurality of regions is not associated with each other.

7. The method of claim 6, wherein the step of transferring at least the portion of the written data from the recovery unit to the non-volatile main memory via natural cache evictions includes the step of transmitting the written data for each cache line of the set of instructions.

8. The method of claim 6, further comprising the step of identifying a failure point within the plurality of regions during the step of executing the recovery code.

9. The method of claim 8, further comprising the steps of resetting any values associated with the written data after the failure point, and recalculating the reset values associated with the written data until the first value matches the second value.

10. The method of claim 1, wherein at least one of the plurality of regions is idempotent.

11. The method of claim 1, further comprising the step of, after the step of executing the recovery code, repeating the method with a second of the plurality of regions, the second of the plurality of regions being a recovery unit.

12. One or more non-transitory tangible computer-readable media having computer-executable instructions for performing a method by running a software program on a computer, the computer operating under an operating system, the method including issuing instructions from the software program to save and recover data, the instructions comprising:

reading written data saved on a recovery unit of a first of a plurality of regions of the media;

calculating a first value for the written data, the first value including a baseline value of the written data;

transferring at least a portion of the written data from the recovery unit to a non-volatile main memory in communication with the computer via natural cache evictions, such that the at least a portion of the written data is transferred in the background and not actively pushed to the non-volatile main memory, thereby reducing computing costs associated with the data transfer;

reading the at least a portion of the written data from the non-volatile main memory and calculating a second value, the second value including a value of the written data transferred from the recovery unit to the non-volatile main memory;

comparing the second value with the first value, wherein a determination that the values do not match indicates a failure occurred, necessitating system recovery; and executing a recovery code to perform the system recovery based on the determination that the values do not match, the recovery code adapted to read through the plurality of regions in reverse order to determine when the failure occurred by comparing the written data from the non-volatile main memory with the written data from the recovery unit, such that the system does not require a step of logging data to create a checkpoint.

13. The one or more non-transitory tangible computer-readable media of claim 12, wherein each of the plurality of regions is associated with the other regions, and wherein the plurality of regions is persisted out of order based on an order of the transfer of written data to the non-volatile main memory.

14. The one or more non-transitory tangible computer-readable media of claim 13, wherein the instructions further comprise the step of identifying a failure point within the plurality of regions during the step of executing the recovery code.

15. The one or more non-transitory tangible computer-readable media of claim 14, wherein the instructions further comprise the steps of resetting any values associated with the written data after the failure point, and recalculating the reset values associated with the written data until the first value matches the second value.

16. The one or more non-transitory tangible computer-readable media of claim 12, wherein the plurality of regions is not associated with each other, and wherein the step of transferring at least the portion of the written data from the recovery unit to the non-volatile main memory via natural cache evictions includes the step of transmitting the written data for each cache line of the set of instructions.

17. The one or more non-transitory tangible computer-readable media of claim 16, wherein the instructions further comprise the step of identifying a failure point within the plurality of regions during the step of executing the recovery code.

18. The one or more non-transitory tangible computer-readable media of claim 17, wherein the instructions further comprise the steps of resetting any values associated with the written data after the failure point, and recalculating the reset values associated with the written data until the first value matches the second value.

19. The one or more non-transitory tangible computer-readable media of claim 12, wherein at least one of the plurality of regions is idempotent.

20. The one or more non-transitory tangible computer-readable media of claim 12, wherein the instructions further comprise the step of, after the step of executing the recovery code, repeating the method with a second of the plurality of regions, the second of the plurality of regions being a recovery unit.

* * * * *